US012323889B2

(12) United States Patent
Gao et al.

(10) Patent No.: US 12,323,889 B2
(45) Date of Patent: Jun. 3, 2025

(54) SECURITY PROTECTION METHOD IN IN-VEHICLE SYSTEM AND DEVICE

(71) Applicant: Shenzhen Yinwang Intelligent Technologies Co., Ltd., Guangdong (CN)

(72) Inventors: Changjian Gao, Shenzhen (CN); Yong Wang, Shenzhen (CN); Yinghui Yu, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 407 days.

(21) Appl. No.: 17/675,966

(22) Filed: Feb. 18, 2022

(65) Prior Publication Data

US 2022/0173902 A1 Jun. 2, 2022

Related U.S. Application Data

(63) Continuation of application No. PCT/CN2020/110078, filed on Aug. 19, 2020.

(30) Foreign Application Priority Data

Aug. 20, 2019 (CN) .......................... 201910770024.8

(51) Int. Cl.
*H04W 4/44* (2018.01)
*H04L 9/08* (2006.01)
(Continued)

(52) U.S. Cl.
CPC ............. *H04W 4/44* (2018.02); *H04L 9/0825* (2013.01); *H04L 9/0877* (2013.01); *H04L 9/3247* (2013.01); *H04L 67/12* (2013.01)

(58) Field of Classification Search
CPC ..... H04L 9/0877; H04L 67/12; H04L 9/0825; H04L 9/3247; H04L 63/08; H04L 63/061;
(Continued)

(56) References Cited

U.S. PATENT DOCUMENTS

2013/0111212 A1* 5/2013 Baltes .................. G06F 21/64
713/176
2013/0159717 A1* 6/2013 Rabadi ................. H04L 9/30
713/176
(Continued)

FOREIGN PATENT DOCUMENTS

CN 106230678 A 12/2016
CN 106899404 A 6/2017
(Continued)

OTHER PUBLICATIONS

Apvrille, L. et al., Secure Automotive On-Board Electronics Network Architecture, Fisita World Automotive Congress 2010, vol. 2 of 5, 2011, pp. 1499-1507, Total 12 Pages.
(Continued)

*Primary Examiner* — Daniel B Potratz
*Assistant Examiner* — Taylor P Vu
(74) *Attorney, Agent, or Firm* — Leydig, Voit & Mayer, Ltd.

(57) ABSTRACT

Embodiments of this application provide a security protection method in an in-vehicle system and a device, relate to the field of internet of vehicles technologies, to deploy a first security protection module on an electronic control unit, deploy a second security protection module on a domain controller, and deploy a third security protection module on a gateway based on security level requirements of the gateway, the domain controller, and the electronic control unit, so that the gateway, the domain controller, and the electronic control unit have different security levels. A security level of the first security protection module is a first security level, a security level of the second security protection module is a second security level, and a security level of the third security protection module is a third security level.

18 Claims, 11 Drawing Sheets

(51) Int. Cl.
*H04L 9/32* (2006.01)
*H04L 67/12* (2022.01)

(58) Field of Classification Search
CPC .......... H04L 65/1033; H04L 65/1069; H04L 9/0861; H04W 4/44; G06F 21/57; G06F 21/602; G06F 21/64; G06F 21/71
See application file for complete search history.

(56) References Cited

U.S. PATENT DOCUMENTS

| | | | |
|---|---|---|---|
| 2014/0058532 | A1 | 2/2014 | Das et al. |
| 2017/0150361 | A1 | 5/2017 | Paryani et al. |
| 2017/0302640 | A1* | 10/2017 | Maletsky ............ H04L 63/12 |
| 2017/0339115 | A1* | 11/2017 | Cho ................... H04W 12/062 |
| 2018/0084412 | A1 | 3/2018 | Alfred et al. |
| 2018/0109622 | A1* | 4/2018 | Galula ............... H04W 84/005 |
| 2018/0336024 | A1* | 11/2018 | Klische .................. G06F 8/65 |
| 2018/0349598 | A1* | 12/2018 | Harel ................ G06F 11/3668 |
| 2019/0182267 | A1 | 6/2019 | Aher et al. |
| 2019/0238555 | A1* | 8/2019 | Buffard ............... H04L 9/3297 |
| 2019/0278585 | A1* | 9/2019 | Becker ................. H04L 9/321 |
| 2019/0347421 | A1* | 11/2019 | Takemori ............. G07C 5/008 |
| 2020/0007319 | A1* | 1/2020 | Herzerg ............... H04L 9/0819 |
| 2020/0021431 | A1* | 1/2020 | Mondello ............... H04W 4/40 |
| 2020/0211301 | A1* | 7/2020 | Zhang ................. H04L 63/065 |
| 2023/0153099 | A1* | 5/2023 | Ujiie ...................... G06F 8/654 |
| | | | 717/174 |

FOREIGN PATENT DOCUMENTS

| | | |
|---|---|---|
| CN | 107846395 A | 3/2018 |
| CN | 109257374 A | 1/2019 |
| CN | 109640293 A | 4/2019 |
| CN | 109714344 A | 5/2019 |
| CN | 109714421 A | 5/2019 |
| CN | 109729056 A | 5/2019 |
| CN | 109995631 A | 7/2019 |
| EP | 3319266 A1 | 5/2018 |
| JP | 2010011400 A | 1/2010 |
| JP | 2013017140 A | 1/2013 |
| JP | 2014138380 A | 7/2014 |
| WO | 2019156716 A1 | 8/2019 |

OTHER PUBLICATIONS

Idrees, M. S. et al., Secure Automotive On-Board Protocols: A Case of Over-the-Air Firmware Updates, Lecture Notes in Computer Science, 2011, vol. 6596, pp. 224-238, Total 16 Pages.

Wolf, M. and Gendrullis, T., Design, Implementation, and Evaluation of a Vehicular Hardware Security Module, Lecture Notes in Computer Science, 2011, vol. 7259, pp. 302-318, Total 18 Pages.

Daniel Zelle et al: "On Using TLS to Secure In-Vehicle Networks", Availability, Reliability and Security, ACM, 2 Penn Plaza, Suite 701 New YORKNY10121-0701 USA, Aug. 29, 2017 (Aug. 29, 2017), XP058371000, Total 10 Pages.

Unknoown: "TCG TPM 2.0 Automotive Thin Profile", Mar. 16, 2015 (Mar. 16, 2015), XP055321412, Total 28 Pages.

Guo Zhihong,"The Implementation of In-Vehicle Ethernet Communication and Security Technology Based on the RX62N Microcontroller",University of Science and Technology of China,2014,with an English abstract,total 82 pages.

Junwon Kim et al.,"Validation of CAN-CAN Gateway in the Automotive Network System",2017 17th International Conference on Control, Automation and Systems (ICCAS 2017),Oct. 18-21, 2017, Ramada Plaza, Jeju, Korea,total 6 pages.

* cited by examiner

SECURITY PROTECTION METHOD IN IN-VEHICLE SYSTEM AND DEVICE

CROSS-REFERENCE TO RELATED APPLICATIONS

This application is a continuation of International Application No. PCT/CN2020/110078, filed on Aug. 19, 2020, which claims priority to Chinese Patent Application No. 201910770024.8, filed on Aug. 20, 2019. The disclosures of the aforementioned applications are hereby incorporated by reference in their entireties.

TECHNICAL FIELD

This application relates to the field of internet of vehicles technologies, and in particular, to a security protection method in an in-vehicle system and a device.

BACKGROUND

Currently, a vehicle having a communication function may be connected to a mobile terminal device such as a smartphone through the internet, and is used to execute various functions, for example, vehicle positioning and vehicle information obtaining. Therefore, the vehicle having the communication function is more vulnerable to a network attack than a mechanical vehicle, and may even be maliciously controlled remotely in an extreme case. Therefore, vehicle security is increasingly important.

In the prior art, vehicle security is improved mainly through four-layer defense. The first layer is an electronic control unit (ECU) layer, and security mechanisms such as secure burning, secure boot, runtime accident monitoring, and secure debugging may be used for the ECU, to improve vehicle security. The second layer is an in-vehicle security communication layer, and communication information of in-vehicle devices can be encrypted, to improve vehicle security. The third layer is an electrical architecture layer, and a gateway may be deployed to manage communication data and access rights. The fourth layer is an internet of vehicles layer. A firewall may be deployed, and an in-vehicle device communicates with an external device through the firewall. In the foregoing multi-layer defense method, each layer has a different function, but security levels of in-vehicle devices are the same. To be specific, security levels of an in-vehicle device (for example, the gateway) having a relatively high security level requirement and an in-vehicle device (for example, the ECU) having a relatively low security level requirement are the same.

SUMMARY

Embodiments of this application provide a security protection method in an in-vehicle system and a device, to deploy a first security protection module on an electronic control unit, deploy a second security protection module on a domain controller, and deploy a third security protection module on a gateway based on security level requirements of the gateway, the domain controller, and the electronic control unit, so that the gateway, the domain controller, and the electronic control unit have different security levels.

To achieve the foregoing objective, the following technical solutions are used in the embodiments of this application:

According to a first aspect, an embodiment of this application provides an in-vehicle system. The in-vehicle system includes a gateway, a domain controller, and an electronic control unit ECU corresponding to the domain controller, the gateway is connected to the domain controller, and the domain controller is connected to the ECU. A first security protection module is deployed on the ECU, the first security protection module is configured to provide security protection for the ECU, and a security level of the first security protection module is a first security level. A second security protection module is deployed on the domain controller, the second security protection module is configured to provide security protection for the domain controller, and a security level of the second security protection module is a second security level. A third security protection module is deployed on the gateway, the third security protection module is configured to provide security protection for the gateway, and a security level of the third security protection module is a third security level.

According to the technical solution provided in the first aspect, the first security protection module can be deployed on the electronic control unit, the second security protection module can be deployed on the domain controller, and the third security protection module can be deployed on the electronic control unit based on security level requirements of the gateway, the domain controller, and the electronic control unit, so that the gateway, the domain controller, and the electronic control unit have different security levels.

With reference to the first aspect, in a first possible implementation, the third security level is higher than or equal to the second security level, and the second security level is higher than the first security level. According to the first possible implementation of the first aspect, security levels of the gateway, the domain controller, and the electronic control unit may be different.

With reference to the first aspect and the first possible implementation of the first aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the first aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level.

According to a second aspect, an embodiment of this application provides a security protection method in an in-vehicle system. The method includes: An electronic control unit ECU generates a public key of the ECU and a private key of the ECU by using a first security protection module, where the first security protection module is configured to provide security protection for the ECU, and a security level of the first security protection module is a first security level. The ECU signs a firmware digest of the ECU by using the private key of the ECU, to obtain first signature information. The ECU sends the first signature information, the public key of the ECU, and the firmware digest of the ECU to a domain controller. The domain controller receives the first signature information, the public key of the ECU, and the firmware digest of the ECU from the ECU. The domain controller sends the first signature information, the public key of the ECU, and the firmware digest of the ECU to a gateway. The gateway receives the first signature information, the public key of the ECU, and the firmware digest of the ECU from the domain controller. The gateway sends the first signature information, the public key of the ECU, and the firmware digest of the ECU to a server.

According to the technical solution provided in the second aspect, the ECU may send, to the server through the domain controller and the gateway, the first signature information obtained based on the firmware digest of the ECU, and the server may perform verification on the first signature information by using the public key of the ECU, to ensure that firmware of the ECU is not tampered with, thereby improving in-vehicle system security.

With reference to the second aspect, in a first possible implementation, the first security protection module includes a device identifier composition engine DICE. According to the first possible implementation of the second aspect, the public key of the ECU and the private key of the ECU are generated by using the DICE, and complexity and costs of the DICE are low. Therefore, deploying the DICE on the ECU for verification on the firmware of the ECU can reduce costs.

With reference to the second aspect and the various possible implementations of the second aspect, in a second possible implementation, the domain controller stores an ECU list, and the ECU is an ECU in the list. According to the second possible implementation of the second aspect, the domain controller may monitor, based on the stored ECU list, whether to perform verification on the firmware digest of the ECU in the ECU list.

With reference to the second aspect and the various possible implementations of the second aspect, in a third possible implementation, the firmware digest of the ECU is obtained by calculating the firmware of the ECU according to a first digest function. According to the third possible implementation of the second aspect, the ECU may obtain the firmware digest of the ECU by calculating the firmware of the ECU according to the first digest function, sign the firmware digest of the ECU by using the private key of the ECU to obtain the first signature information, and send the first signature to the server by using the domain controller and the gateway, so that the server performs verification on the first signature information by using the public key of the ECU, to ensure that the firmware of the ECU is not tampered with, thereby improving in-vehicle system security.

With reference to the second aspect and the various possible implementations of the second aspect, in a fourth possible implementation, the method further includes: The server receives the first signature information, the public key of the ECU, and the firmware digest of the ECU from the gateway. The server performs verification on the first signature information by using the public key of the ECU. If the first signature information has been verified, the server sends first response information to the gateway, where the first response information is used to indicate to start the ECU. The gateway receives the first response information from the server. The gateway sends the first response information to the domain controller. The domain controller receives the first response information from the gateway. The domain controller sends the first response information to the ECU. The ECU receives the first response information from the domain controller. According to the fourth possible implementation of the second aspect, after the server has verified the firmware digest of the ECU, the server may send the first response information to the ECU through the gateway and the domain controller. The ECU may be started based on the first response information. Subsequently, the server may provide a service for the ECU.

According to a third aspect, an embodiment of this application provides a security protection method in an in-vehicle system. The method includes: An electronic control unit ECU generates a public key of the ECU and a private key of the ECU by using a first security protection module, where the first security protection module is configured to provide security protection for the ECU, and a security level of the first security protection module is a first security level. The ECU signs a firmware digest of the ECU by using the private key of the ECU, to obtain first signature information. The ECU sends the first signature information, the public key of the ECU, and the firmware digest of the ECU to a domain controller. The domain controller receives the first signature information, the public key of the ECU, and the firmware digest of the ECU from the ECU. The domain controller generates a public key of the domain controller and a private key of the domain controller by using a second security protection module, where the second security protection module is configured to provide security protection for the domain controller, and a security level of the second security protection module is a second security level. The domain controller performs verification on the first signature information by using the public key of the ECU. If the first signature information has been verified, the domain controller signs the firmware digest of the ECU by using the private key of the domain controller, to obtain second signature information. The domain controller sends the second signature information, the public key of the domain controller, and the firmware digest of the ECU to a gateway. The gateway receives the second signature information, the public key of the domain controller, and the firmware digest of the ECU from the domain controller. The gateway generates a public key of the gateway and a private key of the gateway by using a third security protection module, where the third security protection module is configured to provide security protection for the gateway, and a security level of the third security protection module is a third security level. The gateway performs verification on the second signature information by using the public key of the domain controller. If the second signature information has been verified, the gateway signs the firmware digest of the ECU by using the private key of the gateway, to obtain third signature information. The gateway sends the third signature information, the public key of the gateway, and the firmware digest of the ECU to a server.

According to the technical solution provided in the third aspect, the domain controller may perform, by using the public key of the ECU, verification on the first signature information obtained based on the firmware digest of the ECU. After the verification succeeds, the gateway may perform, by using the public key of the domain controller, verification on the second signature information obtained based on the firmware digest of the ECU. After the verification succeeds, the server may perform, by using the public key of the gateway, verification on the third signature information obtained based on the firmware digest of the ECU. After the verification succeeds, the server may send first response information to the ECU through the gateway and the domain controller. Therefore, three-level verification may be performed on the firmware digest of the ECU, to ensure that firmware of the ECU is not tampered with, thereby improving in-vehicle system security.

With reference to the third aspect, in a first possible implementation, the third security level is higher than or equal to the second security level, and the second security level is higher than the first security level. According to the first possible implementation of the third aspect, security levels of the gateway, the domain controller, and the electronic control unit may be different.

With reference to the third aspect and the first possible implementation of the third aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the third aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level. In addition, complexity and costs of the DICE are low. Therefore, deploying the DICE on the ECU for verification on the firmware of the ECU can reduce costs.

With reference to the third aspect and the various possible implementations of the third aspect, in a third possible implementation, the domain controller stores an ECU list, and the ECU is an ECU in the list. According to the third possible implementation of the third aspect, the domain controller may monitor, based on the stored ECU list, whether to perform verification on the firmware digest of the ECU in the ECU list.

With reference to the third aspect and the various possible implementations of the third aspect, in a fourth possible implementation, the firmware digest of the ECU is obtained by calculating the firmware of the ECU according to a first digest function. According to the fourth possible implementation of the third aspect, the ECU may obtain the firmware digest of the ECU by calculating the firmware of the ECU according to the first digest function, sign the firmware digest of the ECU by using the private key of the ECU to obtain the first signature information, and send the first signature to the domain controller, so that the domain controller performs verification on the first signature information by using the public key of the ECU, to ensure that the firmware of the ECU is not tampered with, thereby improving in-vehicle system security.

With reference to the third aspect and the various possible implementations of the third aspect, in a fifth possible implementation, the method further includes: The server receives the third signature information, the public key of the gateway, and the firmware digest of the ECU from the gateway. The server performs verification on the third signature information by using the public key of the gateway. If the third signature information has been verified, the server sends first response information to the gateway, where the first response information is used to indicate to start the ECU. The gateway receives the first response information from the server. The gateway sends the first response information to the domain controller. The domain controller receives the first response information from the gateway. The domain controller sends the first response information to the ECU. The ECU receives the first response information from the domain controller. According to the fifth possible implementation of the third aspect, after the server has verified the firmware digest of the ECU, the server may send the first response information to the ECU through the gateway and the domain controller. The ECU may be started based on the first response information. Subsequently, the server may provide a service for the ECU.

According to a fourth aspect, an embodiment of this application provides a security protection method in an in-vehicle system. The method is performed by an electronic control unit ECU. A first security protection module is deployed on the ECU, the first security protection module is configured to provide security protection for the ECU, and a security level of the first security protection module is a first security level. The method includes: generating a public key of the ECU and a private key of the ECU by using the first security protection module; signing a firmware digest of the ECU by using the private key of the ECU, to obtain first signature information; and sending the first signature information, the public key of the ECU, and the firmware digest of the ECU to a domain controller.

According to the technical solution provided in the fourth aspect, the ECU may sign the firmware digest of the ECU by using the private key of the ECU, and send the obtained first signature information to the domain controller, so that the domain controller performs verification on the first signature information, thereby improving in-vehicle system security.

With reference to the fourth aspect, in a first possible implementation, a second security protection module is deployed on the domain controller, the second security protection module is configured to provide security protection for the domain controller, and a security level of the second security protection module is a second security level. According to the first possible implementation of the fourth aspect, the second security protection module may be deployed on the domain controller, so that a security level of the domain controller is different from that of the ECU.

With reference to the first possible implementation of the fourth aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated HSM. According to the second possible implementation of the fourth aspect, a security level of the DICE is lower than a security level of the TPM-Thin, the eSE, the chip including a physically isolated security processor SP system, or the chip including a physically isolated HSM chip. Therefore, the first security level is lower than the second security level.

With reference to the fourth aspect and the various possible implementations of the fourth aspect, in a third possible implementation, the domain controller stores an ECU list, and the ECU is an ECU in the list. According to the third possible implementation of the fourth aspect, the domain controller may monitor, based on the stored ECU list, whether to perform verification on the firmware digest of the ECU in the ECU list.

With reference to the fourth aspect and the various possible implementations of the fourth aspect, in a fourth possible implementation, the firmware digest of the ECU is obtained by calculating firmware of the ECU according to a first digest function. According to the fourth possible implementation of the fourth aspect, the ECU may obtain the firmware digest of the ECU by calculating the firmware of the ECU according to the first digest function, sign the firmware digest of the ECU by using the private key of the ECU to obtain the first signature information, and send the first signature to the domain controller, so that the domain controller or a server performs verification on the first signature information by using the public key of the ECU, to ensure that the firmware of the ECU is not tampered with, thereby improving in-vehicle system security.

With reference to the fourth aspect and the various possible implementations of the fourth aspect, in a fifth possible implementation, the method further includes: receiving first response information from the domain controller, where the first response information is used to indicate to start the ECU. According to the fifth possible implementation of the fourth aspect, if the signature information obtained based on the firmware digest of the ECU has been verified, the ECU may receive the first response information from the domain controller, and the ECU is started based on the first response information. Subsequently, the server may provide a service for the ECU.

According to a fifth aspect, an embodiment of this application provides a security protection method in an in-vehicle system. The method is performed by a domain controller. A second security protection module is deployed on the domain controller, the second security protection module is configured to provide security protection for the domain controller, and a security level of the second security protection module is a second security level. The method includes: receiving first signature information, a public key of an electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function; generating a public key of the domain controller and a private key of the domain controller by using the second security protection module; performing verification on the first signature information by using the public key of the ECU; if the first signature information has been verified, signing the firmware digest of the ECU by using the private key of the domain controller, to obtain second signature information; and sending the second signature information, the public key of the domain controller, and the firmware digest of the ECU to a gateway.

According to the technical solution provided in the fifth aspect, the domain controller may perform verification on the first signature information by using the public key of the ECU, after the first signature information has been verified, sign the firmware digest of the ECU by using the private key of the domain controller, and send the obtained second signature information to the gateway, so that the gateway performs verification on the second signature information, thereby improving in-vehicle system security.

With reference to the fifth aspect, in a first possible implementation, a first security protection module is deployed on the ECU, the first security protection module is configured to provide security protection for the ECU, and a security level of the first security protection module is a first security level. A third security protection module is deployed on the gateway, the third security protection module is configured to provide security protection for the gateway, and a security level of the third security protection module is a third security level. According to the first possible implementation of the fifth aspect, the first security protection module may be deployed on the ECU, the second security protection module may be deployed on the domain controller, and the third security protection module may be deployed on the gateway, so that the ECU, the domain controller, and the gateway have different security levels.

With reference to the first possible implementation of the fifth aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the fifth aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level.

With reference to the fifth aspect and the various possible implementations of the fifth aspect, in a third possible implementation, the domain controller stores an ECU list, and the ECU is an ECU in the list. According to the third possible implementation of the fifth aspect, the domain controller may monitor, based on the stored ECU list, whether to perform verification on the firmware digest of the ECU in the ECU list.

With reference to the fifth aspect and the various possible implementations of the fifth aspect, in a fourth possible implementation, the method further includes: receiving first response information from the gateway, where the first response information is used to indicate to start the ECU; and sending the first response information to the ECU. According to the fourth possible implementation of the fifth aspect, if the signature information obtained based on the firmware digest of the ECU has been verified, the domain controller may receive the first response information from the gateway, so that the domain controller sends the first response information to the ECU, and the ECU is started based on the first response information. Subsequently, a server may provide a service for the ECU.

According to a sixth aspect, an embodiment of this application provides a security protection method in an in-vehicle system. The method is performed by a gateway. A third security protection module is deployed on the gateway, the third security protection module is configured to provide security protection for the gateway, and a security level of the third security protection module is a third security level. The method includes: receiving second signature information, a public key of a domain controller, and a firmware digest of the ECU from the domain controller, where the second signature information is obtained by signing the firmware digest of the ECU by using a private key of the domain controller, and the firmware digest of the ECU is obtained by calculating firmware of the ECU according to a first digest function; generating a public key of the gateway and a private key of the gateway by using the third security protection module; performing verification on the second signature information by using the public key of the domain controller; if the second signature information has been verified, signing the firmware digest of the ECU by using the private key of the gateway, to obtain third signature information; and sending the third signature information, the public key of the gateway, and the firmware digest of the ECU to a server.

According to the technical solution provided in the sixth aspect, the gateway may perform verification on the second signature information by using the public key of the domain controller, after the second signature information has been verified, sign the firmware digest of the ECU by using the private key of the gateway, and send the obtained third signature information to the server, so that the server performs verification on the third signature information, thereby improving in-vehicle system security.

With reference to the sixth aspect, in a first possible implementation, a second security protection module is deployed on the domain controller, the second security protection module is configured to provide security protection for the domain controller, and a security level of the second security protection module is a second security level. According to the first possible implementation of the sixth aspect, the second security protection module may be deployed on the domain controller, and the third security protection module may be deployed on the gateway, so that the domain controller and the gateway have different security levels.

With reference to the first possible implementation of the sixth aspect, in a second possible implementation, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the sixth aspect, a security level the TPM-Thin, the eSE, the chip including a physically isolated security processor SP system, or the chip including a physically isolated HSM chip is lower than a security level of the TPM-Rich. Therefore, the second security level is lower than or equal to the third security level.

With reference to the sixth aspect and the various possible implementations of the sixth aspect, in a third possible implementation, the domain controller stores an ECU list, and the ECU is an ECU in the list. According to the third possible implementation of the sixth aspect, the domain controller may monitor, based on the stored ECU list, whether to perform verification on the firmware digest of the ECU in the ECU list.

With reference to the sixth aspect and the various possible implementations of the sixth aspect, in a fourth possible implementation, the method further includes: receiving first response information from the server, where the first response information is used to indicate to start the ECU; and sending the first response information to the domain controller. According to the fourth possible implementation of the sixth aspect, if the signature information obtained based on the firmware digest of the ECU has been verified, the gateway may receive the first response information from the server, so that the gateway sends the first response information to the ECU through the domain controller, and the ECU is started based on the first response information. Subsequently, the server may provide a service for the ECU.

According to a seventh aspect, an embodiment of this application provides a security protection method in an in-vehicle system. The method is performed by a domain controller. A second security protection module is deployed on the domain controller, the second security protection module is configured to provide security protection for the domain controller, and a security level of the second security protection module is a second security level. The method includes: receiving first signature information, a public key of an electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function; and sending the first signature information, the public key of the ECU, and the firmware digest of the ECU to a gateway.

According to the technical solution provided in the seventh aspect, the domain controller may send the first signature information to the gateway, so that the gateway sends the first signature information to a server, and the server performs verification on the first signature information, thereby improving in-vehicle system security.

With reference to the seventh aspect, in a first possible implementation, a first security protection module is deployed on the ECU, the first security protection module is configured to provide security protection for the ECU, and a security level of the first security protection module is a first security level. A third security protection module is deployed on the gateway, the third security protection module is configured to provide security protection for the gateway, and a security level of the third security protection module is a third security level. According to the first possible implementation of the seventh aspect, the first security protection module may be deployed on the ECU, the second security protection module may be deployed on the domain controller, and the third security protection module may be deployed on the gateway, so that the ECU, the domain controller, and the gateway have different security levels.

With reference to the first possible implementation of the seventh aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the seventh aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level.

With reference to the seventh aspect and the various possible implementations of the seventh aspect, in a third possible implementation, the domain controller stores an ECU list, and the ECU is an ECU in the list. According to the third possible implementation of the seventh aspect, the domain controller may monitor, based on the stored ECU list, whether to perform verification on the firmware digest of the ECU in the ECU list.

With reference to the seventh aspect and the various possible implementations of the seventh aspect, in a fourth possible implementation, the method further includes: receiving first response information from the gateway, where the first response information is used to indicate to start the ECU; and sending the first response information to the ECU. According to the fourth possible implementation of the seventh aspect, if the signature information obtained based on the firmware digest of the ECU has been verified, the domain controller may receive the first response information from the gateway, so that the domain controller sends the first response information to the ECU, and the ECU is started based on the first response information. Subsequently, the server may provide a service for the ECU.

According to an eighth aspect, an embodiment of this application provides a security protection method in an in-vehicle system. The method is performed by a gateway. A third security protection module is deployed on the gateway, the third security protection module is configured to provide security protection for the gateway, and a security level of the third security protection module is a third security level. The method includes: receiving first signature information, a public key of the ECU, and a firmware digest of the ECU from a domain controller, where the first signature information is obtained by signing the firmware digest of the ECU by using a private key of the ECU, and the firmware digest of the ECU is obtained by calculating firmware of the ECU according to a first digest function; and sending the first signature information, the public key of the ECU, and the firmware digest of the ECU to a server.

According to the technical solution provided in the eighth aspect, the gateway may send the first signature information to the server, so that the server performs verification on the first signature information, thereby improving in-vehicle system security.

With reference to the eighth aspect, in a first possible implementation, a second security protection module is deployed on the domain controller, the second security protection module is configured to provide security protection for the domain controller, and a security level of the second security protection module is a second security level. According to the first possible implementation of the eighth aspect, the second security protection module may be deployed on the domain controller, and the third security protection module may be deployed on the gateway, so that the domain controller and the gateway have different security levels.

With reference to the first possible implementation of the eighth aspect, in a second possible implementation, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the eighth aspect, a security level the TPM-Thin, the eSE, the chip including a physically isolated security processor SP system, or the chip including a physically isolated HSM chip is lower than a security level of the TPM-Rich. Therefore, the second security level is lower than or equal to the third security level.

With reference to the eighth aspect and the various possible implementations of the eighth aspect, in a third possible implementation, the domain controller stores an ECU list, and the ECU is an ECU in the list. According to the third possible implementation of the eighth aspect, the domain controller may monitor, based on the stored ECU list, whether to perform verification on the firmware digest of the ECU in the ECU list.

With reference to the eighth aspect and the various possible implementations of the eighth aspect, in a fourth possible implementation, the method further includes: receiving first response information from the server, where the first response information is used to indicate to start the ECU; and sending the first response information to the domain controller. According to the fourth possible implementation of the eighth aspect, if the signature information obtained based on the firmware digest of the ECU has been verified, the gateway may receive the first response information from the server, so that the gateway sends the first response information to the ECU through the domain controller, and the ECU is started based on the first response information. Subsequently, the server may provide a service for the ECU.

According to a ninth aspect, an embodiment of this application provides an in-vehicle security protection system. The in-vehicle security protection system has a function of implementing the method and the function described in the second aspect. The function may be implemented by hardware, or may be implemented by hardware by executing corresponding software. The hardware or the software includes one or more modules corresponding to the function.

According to a tenth aspect, an embodiment of this application provides an in-vehicle security protection system. The in-vehicle security protection system has a function of implementing the method and the function described in the third aspect. The function may be implemented by hardware, or may be implemented by hardware by executing corresponding software. The hardware or the software includes one or more modules corresponding to the function.

According to an eleventh aspect, an embodiment of this application provides an electronic control unit ECU. A first security protection module is deployed on the ECU, the first security protection module is configured to provide security protection for the ECU, and a security level of the first security protection module is a first security level. The ECU includes a generation module, a signing module, and a sending module. The generation module is configured to generate a public key of the ECU and a private key of the ECU by using the first security protection module. The signing module is configured to sign a firmware digest of the ECU by using the private key of the ECU, to obtain first signature information, where firmware digest of the ECU is obtained by calculating firmware of the ECU. The sending module is configured to send the first signature information, the public key of the ECU, and the firmware digest of the ECU to a domain controller.

According to the technical solution provided in the eleventh aspect, the ECU may sign the firmware digest of the ECU by using the private key of the ECU, and send the obtained first signature information to the domain controller, so that the domain controller performs verification on the first signature information, thereby improving in-vehicle system security.

With reference to the eleventh aspect, in a first possible implementation, a second security protection module is deployed on the domain controller, the second security protection module is configured to provide security protection for the domain controller, and a security level of the second security protection module is a second security level. According to the first possible implementation of the eleventh aspect, the second security protection module may be deployed on the domain controller, so that a security level of the domain controller is different from that of the ECU.

With reference to the first possible implementation of the eleventh aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated HSM. According to the second possible implementation of the eleventh aspect, a security level of the DICE is lower than a security level of the TPM-Thin, the eSE, the chip including a physically isolated security processor SP system, or the chip including a physically isolated HSM chip. Therefore, the first security level is lower than the second security level.

With reference to the eleventh aspect and the various possible implementations of the eleventh aspect, in a third possible implementation, the domain controller stores an ECU list, and the ECU is an ECU in the list. According to the third possible implementation of the eleventh aspect, the domain controller may monitor, based on the stored ECU list, whether to perform verification on the firmware digest of the ECU in the ECU list.

With reference to the eleventh aspect and the various possible implementations of the eleventh aspect, in a fourth possible implementation, the firmware digest of the ECU is obtained by calculating the firmware of the ECU according to a first digest function. According to the fourth possible implementation of the eleventh aspect, the ECU may obtain the firmware digest of the ECU by calculating the firmware of the ECU according to the first digest function, sign the firmware digest of the ECU by using the private key of the ECU to obtain the first signature information, and send the first signature to the domain controller, so that the domain controller or a server performs verification on the first signature information by using the public key of the ECU, to ensure that the firmware of the ECU is not tampered with, thereby improving in-vehicle system security.

With reference to the eleventh aspect and the various possible implementations of the eleventh aspect, in a fifth possible implementation, the ECU further includes: a receiving module, configured to receive first response information from the domain controller, where the first response information is used to indicate to start the ECU. According to the fifth possible implementation of the eleventh aspect, if the signature information obtained based on the firmware digest of the ECU has been verified, the ECU may receive the first response information from the domain controller, and the ECU is started based on the first response information. Subsequently, the server may provide a service for the ECU.

According to a twelfth aspect, an embodiment of this application provides a domain controller. A second security protection module is deployed on the domain controller, the second security protection module is configured to provide security protection for the domain controller, and a security level of the second security protection module is a second security level. The domain controller includes a receiving module, a generation module, a verification module, a signing module, and a sending module. The receiving module is configured to receive first signature information, a public key of an electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function. The generation module is configured to generate a public key of the domain controller and a private key of the domain controller by using the second security protection module. The verification module is configured to perform verification on the first signature information by using the public key of the ECU. The signing module is configured to: if the first signature information has been verified, sign the firmware digest of the ECU by using the private key of the domain controller, to obtain second signature information. The sending module is configured to send the second signature information, the public key of the domain controller, and the firmware digest of the ECU to a gateway.

According to the technical solution provided in the twelfth aspect, the domain controller may perform verification on the first signature information by using the public key of the ECU, after the first signature information has been verified, sign the firmware digest of the ECU by using the private key of the domain controller, and send the obtained second signature information to the gateway, so that the gateway performs verification on the second signature information, thereby improving in-vehicle system security.

With reference to the twelfth aspect, in a first possible implementation, a first security protection module is deployed on the ECU, the first security protection module is configured to provide security protection for the ECU, and a security level of the first security protection module is a first security level. A third security protection module is deployed on the gateway, the third security protection module is configured to provide security protection for the gateway, and a security level of the third security protection module is a third security level. According to the first possible implementation of the twelfth aspect, the first security protection module may be deployed on the ECU, the second security protection module may be deployed on the domain controller, and the third security protection module may be deployed on the gateway, so that the ECU, the domain controller, and the gateway have different security levels.

With reference to the first possible implementation of the twelfth aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the twelfth aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level.

With reference to the twelfth aspect and the various possible implementations of the twelfth aspect, in a third possible implementation, the domain controller stores an ECU list, and the ECU is an ECU in the list. According to the third possible implementation of the twelfth aspect, the domain controller may monitor, based on the stored ECU list, whether to perform verification on the firmware digest of the ECU in the ECU list.

With reference to the twelfth aspect and the various possible implementations of the twelfth aspect, in a fourth possible implementation, the receiving module is further configured to receive first response information from the gateway, where the first response information is used to indicate to start the ECU; and the sending module is further configured to send the first response information to the ECU. According to the fourth possible implementation of the twelfth aspect, if the signature information obtained based on the firmware digest of the ECU has been verified, the domain controller may receive the first response information from the gateway, so that the domain controller sends the first response information to the ECU, and the ECU is started based on the first response information. Subsequently, a server may provide a service for the ECU.

According to a thirteenth aspect, an embodiment of this application provides a gateway. A third security protection module is deployed on the gateway, the third security protection module is configured to provide security protection for the gateway, and a security level of the third security protection module is a third security level. The gateway includes a receiving module, a generation module, a verification module, a signing module, and a sending module. The receiving module is configured to receive second signature information, a public key of a domain controller, and a firmware digest of the ECU from the domain controller, where the second signature information is obtained by signing the firmware digest of the ECU by using a private key of the domain controller, and the firmware digest of the ECU is obtained by calculating firmware of the ECU according to a first digest function. The generation module is configured to generate a public key of the gateway and a private key of the gateway by using the third security protection module. The verification module is configured to perform verification on the second signature information by using the public key of the domain controller. The signing module is configured to: if the second signature information has been verified, sign the firmware digest of the ECU by using the private key of the gateway, to obtain third signature information. The sending module is configured to send the third signature information, the public key of the gateway, and the firmware digest of the ECU to a server.

According to the technical solution provided in the thirteenth aspect, the gateway may perform verification on the second signature information by using the public key of the domain controller, after the second signature information has been verified, sign the firmware digest of the ECU by using the private key of the gateway, and send the obtained third signature information to the server, so that the server performs verification on the third signature information, thereby improving in-vehicle system security.

With reference to the thirteenth aspect, in a first possible implementation, a second security protection module is deployed on the domain controller, the second security protection module is configured to provide security protection for the domain controller, and a security level of the second security protection module is a second security level. According to the first possible implementation of the thirteenth aspect, the second security protection module may be deployed on the domain controller, and the third security protection module may be deployed on the gateway, so that the domain controller and the gateway have different security levels.

With reference to the first possible implementation of the thirteenth aspect, in a second possible implementation, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the thirteenth aspect, a security level the TPM-Thin, the eSE, the chip including a physically isolated security processor SP system, or the chip including a physically isolated HSM chip is lower than a security level of the TPM-Rich. Therefore, the second security level is lower than or equal to the third security level.

With reference to the thirteenth aspect and the various possible implementations of the thirteenth aspect, in a third possible implementation, the domain controller stores an ECU list, and the ECU is an ECU in the list. According to the third possible implementation of the thirteenth aspect, the domain controller may monitor, based on the stored ECU list, whether to perform verification on the firmware digest of the ECU in the ECU list.

With reference to the thirteenth aspect and the various possible implementations of the thirteenth aspect, in a fourth possible implementation, the receiving module is further configured to receive first response information from the server, where the first response information is used to indicate to start the ECU; and the sending module is further configured to send the first response information to the domain controller. According to the fourth possible implementation of the thirteenth aspect, if the signature information obtained based on the firmware digest of the ECU has been verified, the gateway may receive the first response information from the server, so that the gateway sends the first response information to the ECU through the domain controller, and the ECU is started based on the first response information. Subsequently, the server may provide a service for the ECU.

According to a fourteenth aspect, an embodiment of this application provides a domain controller. A second security protection module is deployed on the domain controller, the second security protection module is configured to provide security protection for the domain controller, and a security level of the second security protection module is a second security level. The domain controller includes a receiving module and a sending module. The receiving module is configured to receive first signature information, a public key of an electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function. The sending module is configured to send the first signature information, the public key of the ECU, and the firmware digest of the ECU to a gateway.

According to the technical solution provided in the fourteenth aspect, the domain controller may send the first signature information to the gateway, so that the gateway sends the first signature information to a server, and the server performs verification on the first signature information, thereby improving in-vehicle system security.

With reference to the fourteenth aspect, in a first possible implementation, a first security protection module is deployed on the ECU, the first security protection module is configured to provide security protection for the ECU, and a security level of the first security protection module is a first security level. A third security protection module is deployed on the gateway, the third security protection module is configured to provide security protection for the gateway, and a security level of the third security protection module is a third security level. According to the first possible implementation of the fourteenth aspect, the first security protection module may be deployed on the ECU, the second security protection module may be deployed on the domain controller, and the third security protection module may be deployed on the gateway, so that the ECU, the domain controller, and the gateway have different security levels.

With reference to the first possible implementation of the fourteenth aspect, in a second possible implementation, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the fourteenth aspect, a security level of the DICE is lower than a security level of the TPM-Thin, the eSE, the chip including a physically isolated security processor SP system, or the chip including a physically isolated HSM, and the security level of the TPM-Thin, the eSE, the chip including a physically isolated security processor SP system, or the chip including a physically isolated HSM is lower than a security level of the TPM-Rich. Therefore, the first security level is lower than the second security level, and the second security level is lower than or equal to the third security level.

With reference to the fourteenth aspect and the various possible implementations of the fourteenth aspect, in a third possible implementation, the domain controller stores an ECU list, and the ECU is an ECU in the list. According to the third possible implementation of the fourteenth aspect, the domain controller may monitor, based on the stored ECU list, whether to perform verification on the firmware digest of the ECU in the ECU list.

With reference to the fourteenth aspect and the various possible implementations of the fourteenth aspect, in a fourth possible implementation, the receiving module is configured to receive first response information from the gateway, where the first response information is used to indicate to start the ECU; and the sending module is configured to send the first response information to the ECU. According to the fourth possible implementation of the fourteenth aspect, if the signature information obtained based on the firmware digest of the ECU has been verified, the domain controller may receive the first response information from the gateway, so that the domain controller sends the first response information to the ECU, and the ECU is started based on the first response information. Subsequently, the server may provide a service for the ECU.

According to a fifteenth aspect, an embodiment of this application provides a gateway. A third security protection module is deployed on the gateway, the third security protection module is configured to provide security protection for the gateway, and a security level of the third security protection module is a third security level. The gateway includes a receiving module and a sending module. The receiving module is configured to receive first signature information, a public key of the ECU, and a firmware digest of the ECU from a domain controller, where the first signature information is obtained by signing the firmware digest of the ECU by using a private key of the ECU, and the firmware digest of the ECU is obtained by calculating firmware of the ECU according to a first digest function. The sending module is configured to send the first signature information, the public key of the ECU, and the firmware digest of the ECU to a server.

According to the technical solution provided in the fifteenth aspect, the gateway may send the first signature information to the server, so that the server performs verification on the first signature information, thereby improving in-vehicle system security.

With reference to the fifteenth aspect, in a first possible implementation, a second security protection module is deployed on the domain controller, the second security protection module is configured to provide security protection for the domain controller, and a security level of the second security protection module is a second security level. According to the first possible implementation of the fifteenth aspect, the second security protection module may be deployed on the domain controller, and the third security protection module may be deployed on the gateway, so that the domain controller and the gateway have different security levels.

With reference to the first possible implementation of the fifteenth aspect, in a second possible implementation, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM. According to the second possible implementation of the fifteenth aspect, a security level the TPM-Thin, the eSE, the chip including a physically isolated security processor SP system, or the chip including a physically isolated HSM chip is lower than a security level of the TPM-Rich. Therefore, the second security level is lower than or equal to the third security level.

With reference to the fifteenth aspect and the various possible implementations of the fifteenth aspect, in a third possible implementation, the domain controller stores an ECU list, and the ECU is an ECU in the list. According to the third possible implementation of the fifteenth aspect, the domain controller may monitor, based on the stored ECU list, whether to perform verification on the firmware digest of the ECU in the ECU list.

With reference to the fifteenth aspect and the various possible implementations of the fifteenth aspect, in a fourth possible implementation, the receiving module is further configured to receive first response information from the server, where the first response information is used to indicate to start the ECU; and the sending module is configured to send the first response information to the domain controller. According to the fourth possible implementation of the fifteenth aspect, if the signature information obtained based on the firmware digest of the ECU has been verified, the gateway may receive the first response information from the server, so that the gateway sends the first response information to the ECU through the domain controller, and the ECU is started based on the first response information. Subsequently, the server may provide a service for the ECU.

According to a sixteenth aspect, an embodiment of this application provides an electronic control unit ECU, including at least one processor, at least one memory, and a communications interface. The communications interface and the at least one memory are coupled to the at least one processor. The ECU communicates with another device through the communications interface. The at least one memory is configured to store a computer program, so that when the computer program is executed by the at least one processor, the security protection method in an in-vehicle system according to the fourth aspect and the possible implementations of the fourth aspect is implemented.

According to a seventeenth aspect, an embodiment of this application provides a domain controller, including at least one processor, at least one memory, and a communications interface. The communications interface and the at least one memory are coupled to the at least one processor. The domain controller communicates with another device through the communications interface. The at least one memory is configured to store a computer program, so that when the computer program is executed by the at least one processor, the security protection method in an in-vehicle system according to the fifth aspect and the possible implementations of the fifth aspect is implemented.

According to an eighteenth aspect, an embodiment of this application provides a gateway, including at least one processor, at least one memory, and a communications interface. The communications interface and the at least one memory are coupled to the at least one processor. The gateway communicates with another device through the communications interface. The at least one memory is configured to store a computer program, so that when the computer program is executed by the at least one processor, the security protection method in an in-vehicle system according to the sixth aspect and the possible implementations of the sixth aspect is implemented.

According to a nineteenth aspect, an embodiment of this application provides a domain controller, including at least one processor, at least one memory, and a communications interface. The communications interface and the at least one memory are coupled to the at least one processor. The domain controller communicates with another device through the communications interface. The at least one memory is configured to store a computer program, so that when the computer program is executed by the at least one processor, the security protection method in an in-vehicle system according to the seventh aspect and the possible implementations of the seventh aspect is implemented.

According to a twentieth aspect, an embodiment of this application provides a gateway, including at least one processor, at least one memory, and a communications interface. The communications interface and the at least one memory are coupled to the at least one processor. The gateway communicates with another device through the communications interface. The at least one memory is configured to store a computer program, so that when the computer program is executed by the at least one processor, the security protection method in an in-vehicle system according to the eighth aspect and the possible implementations of the eighth aspect is implemented.

According to a twenty-first aspect, this application provides a system chip. The system chip may be used in an electronic control unit ECU, the system chip includes at least one processor, and a related program instruction is executed in the at least one processor, to implement the functions of the ECU according to the method in the fourth aspect and any design of the fourth aspect. Optionally, the system chip may further include at least one memory, and the memory stores the related program instruction.

According to a twenty-second aspect, this application provides a system chip. The system chip may be used in a domain controller, the system chip includes at least one processor, and a related program instruction is executed in the at least one processor, to implement the functions of the domain controller according to the method in the fifth aspect and any design of the fifth aspect. Optionally, the system chip may further include at least one memory, and the memory stores the related program instruction.

According to a twenty-third aspect, this application provides a system chip. The system chip may be used in a gateway, the system chip includes at least one processor, and a related program instruction is executed in the at least one processor, to implement the functions of the gateway according to the method in the sixth aspect and any design of the sixth aspect. Optionally, the system chip may further include at least one memory, and the memory stores the related program instruction.

According to a twenty-fourth aspect, this application provides a system chip. The system chip may be used in a domain controller, the system chip includes at least one processor, and a related program instruction is executed in the at least one processor, to implement the functions of the domain controller according to the method in the seventh aspect and any design of the seventh aspect. Optionally, the system chip may further include at least one memory, and the memory stores the related program instruction.

According to a twenty-fifth aspect, this application provides a system chip. The system chip may be used in a gateway, the system chip includes at least one processor, and a related program instruction is executed in the at least one processor, to implement the functions of the gateway according to the method in the eighth aspect and any design of the eighth aspect. Optionally, the system chip may further include at least one memory, and the memory stores the related program instruction.

According to a twenty-sixth aspect, an embodiment of this application provides a computer readable storage medium, for example, a non-transient computer readable storage medium. A computer program is stored on the computer readable storage medium, and when the computer program is run on a computer, the computer is enabled to perform any possible method in the second aspect. For example, the computer may be at least one storage node.

According to a twenty-seventh aspect, an embodiment of this application provides a computer readable storage medium, for example, a non-transient computer readable storage medium. A computer program is stored on the computer readable storage medium, and when the computer program is run on a computer, the computer is enabled to perform any possible method in the third aspect. For example, the computer may be at least one storage node.

According to a twenty-eighth aspect, an embodiment of this application provides a computer readable storage medium, for example, a non-transient computer readable storage medium. A computer program is stored on the computer readable storage medium, and when the computer program is run on a computer, the computer is enabled to perform any possible method in the fourth aspect. For example, the computer may be at least one storage node.

According to a twenty-ninth aspect, an embodiment of this application provides a computer readable storage medium, for example, a non-transient computer readable storage medium. A computer program is stored on the computer readable storage medium, and when the computer program is run on a computer, the computer is enabled to perform any possible method in the fifth aspect. For example, the computer may be at least one storage node.

According to a thirtieth aspect, an embodiment of this application provides a computer readable storage medium, for example, a non-transient computer readable storage medium. A computer program is stored on the computer readable storage medium, and when the computer program is run on a computer, the computer is enabled to perform any possible method in the sixth aspect. For example, the computer may be at least one storage node.

According to a thirty-first aspect, an embodiment of this application provides a computer readable storage medium, for example, a non-transient computer readable storage medium. A computer program is stored on the computer readable storage medium, and when the computer program is run on a computer, the computer is enabled to perform any possible method in the seventh aspect. For example, the computer may be at least one storage node.

According to a thirty-second aspect, an embodiment of this application provides a computer readable storage medium, for example, a non-transient computer readable storage medium. A computer program is stored on the computer readable storage medium, and when the computer program is run on a computer, the computer is enabled to perform any possible method in the eighth aspect. For example, the computer may be at least one storage node.

According to a thirty-third aspect, an embodiment of this application provides a computer program product. When the computer program product is run on a computer, any method provided in the second aspect is performed. For example, the computer may be at least one storage node.

According to a thirty-fourth aspect, an embodiment of this application provides a computer program product. When the computer program product is run on a computer, any method provided in the third aspect is performed. For example, the computer may be at least one storage node.

According to a thirty-fifth aspect, an embodiment of this application provides a computer program product. When the computer program product is run on a computer, any method provided in the fourth aspect is performed. For example, the computer may be at least one storage node.

According to a thirty-sixth aspect, an embodiment of this application provides a computer program product. When the computer program product is run on a computer, any method provided in the fifth aspect is performed. For example, the computer may be at least one storage node.

According to a thirty-seventh aspect, an embodiment of this application provides a computer program product. When the computer program product is run on a computer, any method provided in the sixth aspect is performed. For example, the computer may be at least one storage node.

According to a thirty-eighth aspect, an embodiment of this application provides a computer program product. When the computer program product is run on a computer, any method provided in the seventh aspect is performed. For example, the computer may be at least one storage node.

According to a thirty-ninth aspect, an embodiment of this application provides a computer program product. When the computer program product is run on a computer, any method provided in the eighth aspect is performed. For example, the computer may be at least one storage node.

According to a fortieth aspect, an embodiment of this application provides an in-vehicle security protection system. The in-vehicle security protection system may include any one or more of the following: the ECU in the fourth aspect, the domain controller in the fifth aspect, the gateway in the sixth aspect, the domain controller in the seventh aspect, the gateway in the eighth aspect, the ECU in the eleventh aspect, the domain controller in the twelfth aspect, the gateway in the thirteenth aspect, the domain controller in the fourteenth aspect, the gateway in the fifteenth aspect, the ECU in the sixteenth aspect, the domain controller in the seventeenth aspect, the gateway in the eighteenth aspect, the domain controller in the nineteenth aspect, the gateway in the twentieth aspect, the system chip in the twenty-first aspect, the system chip in the twenty-second aspect, the system chip in the twenty-third aspect, the system chip in the twenty-fourth aspect, the system chip in the twenty-fifth aspect, the computer readable storage medium in the twenty-sixth aspect, the computer readable storage medium in the twenty-seventh aspect, the computer readable storage medium in the twenty-eighth aspect, the computer readable storage medium in the twenty-ninth aspect, the computer readable storage medium in the thirtieth aspect, the computer readable storage medium in the thirty-first aspect, the computer readable storage medium in the thirty-second aspect, the computer program product in the thirty-third aspect, the computer program product in the thirty-fourth aspect, the computer program product in the thirty-fifth aspect, the computer program product in the thirty-sixth aspect, the computer program product in the thirty-seventh aspect, the computer program product in the thirty-eighth aspect, or the computer program product in the thirty-ninth aspect.

It may be understood that any one of the in-vehicle system, the in-vehicle security protection system, the ECU, the domain controller, the gateway, the system chip, the computer storage medium, the computer program product, or the like provided above is configured to perform the corresponding method provided above. Therefore, for beneficial effects that can be achieved by the in-vehicle security protection system, the ECU, the domain controller, the gateway, the system chip, the computer storage medium, the computer program product, or the like, refer to the beneficial effects in the corresponding method. Details are not described herein again.

BRIEF DESCRIPTION OF DRAWINGS

FIG. 1(*b*) is a schematic architectural diagram of an in-vehicle system according to an embodiment of this application;

DESCRIPTION OF EMBODIMENTS

The following describes implementations of the embodiments of this application in detail with reference to accompanying drawings.

Figure 1A:
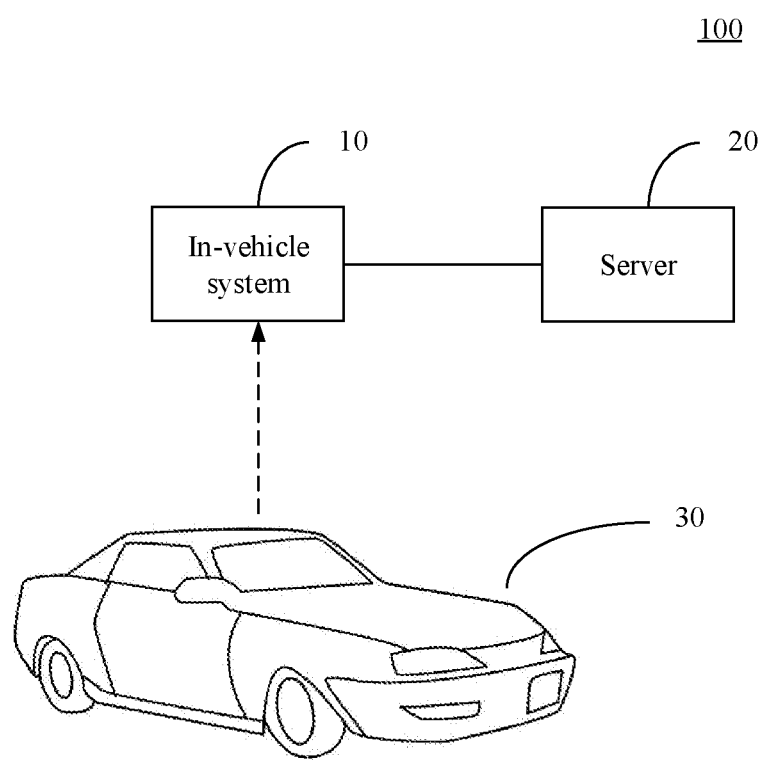
FIG. 1(*a*) is a schematic architectural diagram of an in-vehicle security protection system according to an embodiment of this application.

FIG. 1(a) is a schematic architectural diagram of an in-vehicle security protection system 100 according to an embodiment of this application. In FIG. 1(a), the in-vehicle security protection system 100 may include an in-vehicle system 10 and a server 20.

The in-vehicle system 10 in FIG. 1(a) may be an in-vehicle system of a vehicle 30, and the in-vehicle system 10 may include a plurality of devices. For example, the in-vehicle system 10 may include devices such as an in-vehicle T-Box (Telematics BOX), a gateway, an in-vehicle infotainment (IVI) system, a vehicle control unit (VCU), and an advanced driving assistance system (ADAS). Specifically, an architecture of the in-vehicle system 10 may be shown in FIG. 1(b).

Figure 1B:
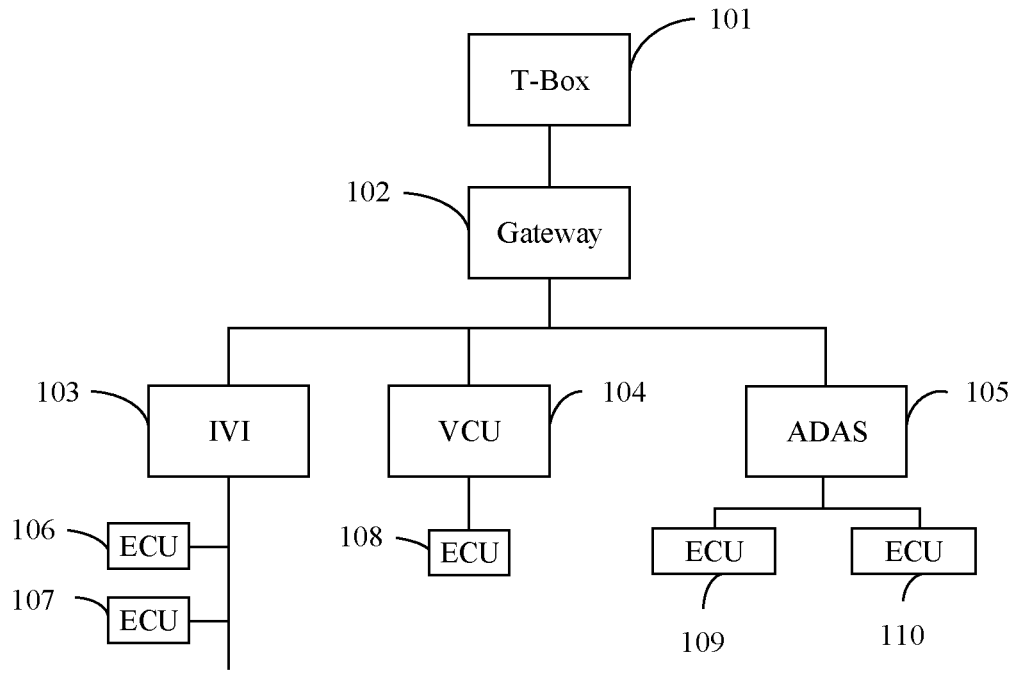

FIG. 1(b) is a schematic architectural diagram of an in-vehicle system 10 according to an embodiment of this application. As shown in FIG. 1(b), the in-vehicle system 10 includes a T-Box 101, a gateway 102, an IVI 103, a VCU 104, an ADAS 105, and an ECU 106 to an ECU 110. The IVI 103, the VCU 104, and the ADAS 105 may be collectively referred to as a domain controller. The ECU 106 and the ECU 107 are ECUs corresponding to the IVI 103, the ECU 108 is an ECU corresponding to the VCU 104, and the ECU 109 and ECU 110 are ECUs corresponding to the ADAS 105.

The T-Box 101 and the gateway 102 may be connected to each other through the Ethernet. The gateway 102 and the domain controller may be connected to each other through the Ethernet or a controller area network (CAN). For example, the gateway 102 and the IVI 103 may be connected to each other through the Ethernet or a CAN. The domain controller and the ECU may be connected to each other through the Ethernet or a CAN. For example, the VCU 104 and the ECU 108 may be connected to each other through the Ethernet or a CAN, and the ADAS 105 and the ECU 109 may be connected to each other through the Ethernet or a CAN.

A second security protection module may be deployed on the T-Box 101 and the domain controller (for example, the IVI 103, the VCU 104, or the ADAS 105) in FIG. 1(b), and the second security protection module may be configured to provide security protection for the T-Box 101 or the domain controller. A security level of the second security protection module is a second security level. The second security protection module includes a trusted platform module-thin (TPM-Thin), an embedded secure element (eSE), a chip including a physically isolated security processor (SP) system, or a chip including a physically isolated hardware security module (HSM).

A third security protection module may be deployed on the gateway 102 in FIG. 1(b), the third security protection module may be configured to provide security protection for the gateway 102, and a security level of the third security protection module is a third security level. The third security protection module includes a trusted platform module-rich (TPM-Rich), an eSE, a chip including a physically isolated security processor SP system, or a chip including a physically isolated HSM.

A first security protection module may be deployed on the ECU 106 to the ECU 110 in FIG. 1(b), the first security protection module may be configured to provide security protection for the ECU 106 to the ECU 110, and a security level of the first security protection module is a first security level. The first security protection module includes a device identifier composition engine DICE).

It is well-known to a person skilled in the art that, a security level of software is lower than a security level of hardware, and a security level of the TPM-Thin is lower than a security level of the TPM-Rich. Therefore, the first security level is lower than the second security level, and the second security level is lower than or equal to the third security level.

It should be noted that deployment manners of the first security protection module, the second security protection module, and the third security protection module are merely examples. A person skilled in the art should understand that in a specific implementation process, a corresponding security protection module may be deployed on a device (for example, a gateway, a T-Box, a domain controller, and an ECU) in the in-vehicle system as required. For example, if a security level of the VCU 104 needs to be improved, the third security protection module may be deployed on the VCU 104. If a security level of the ECU 106 needs to be improved, the second security protection module may be deployed on the ECU 106. If security protection does not need to be provided for the ECU 107, a security protection module may not be deployed on the ECU 107.

The T-Box 101 in FIG. 1(b) may have a capability of communicating with an external device of the in-vehicle system 10 and an internal device of the in-vehicle system 10. The external device of the in-vehicle system 10 may be described as a device outside the in-vehicle system 10, for example, the server 20 in FIG. 1(a). The internal device of the in-vehicle system 10 may be a device shown in FIG. 1(b), for example, the gateway 102, the IVI 103, or the ECU 106.

The T-Box 101 in FIG. 1(b) communicates with an internal device of the in-vehicle system 10, and may be configured to receive information (for example, a firmware digest of the ECU 106) about the internal device of the in-vehicle system 10. The T-Box 101 communicates with an internal device of the in-vehicle system 10, and may be further configured to forward (or transparently transmit), to the internal device of the in-vehicle system 10, received information sent by an external device of the in-vehicle system 10 (for example, forward (or transparently transmit), to the gateway 102, first response information sent by the server 20). The T-Box 101 communicates with an external device of the in-vehicle system 10, and may be configured to perform verification on an internal device of the in-vehicle system 10 (for example, the T-Box 101 sends first signature information, a public key of an ECU, and the firmware digest of the ECU to the server 20, and after the server 20 performs verification on first signature information, receives the first response information sent by the server 20).

The gateway 102 in FIG. 1(b) may have a capability of performing verification on firmware of an ECU. For example, the gateway 102 receives second signature information, a public key of the VCU 104, and a firmware digest of the ECU 108 from the VCU 104, where the second signature information is obtained by calculating the firmware digest of the ECU 108 according to a third digest function and encrypting, by using a private key of the VCU 104, a digest obtained through calculation. The gateway 102 may decrypt the second signature information by using the public key of the VCU 104, calculate the firmware digest of the ECU 108 according to the third digest function, and verify whether the decrypted second signature information is consistent with a digest obtained by calculating the firmware digest of the ECU 108 according to the third digest function.

The gateway 102 in FIG. 1(b) may further have a capability of signing a firmware digest of an ECU. For example, the gateway 102 verifies that the decrypted second signature information is consistent with the digest obtained by calculating the firmware digest of the ECU 108 according to the third digest function, and the gateway 102 may calculate the firmware digest of the ECU 108 according to a fourth digest function, and encrypt, by using a private key of the gateway 102, a digest obtained through calculation.

The domain controller in FIG. 1(b) may have a capability of performing verification on firmware of an ECU. For example, the IVI 103 receives the first signature information, a public key of the ECU 106, and the firmware digest of the ECU 106 from the ECU 106, where the first signature information is obtained by calculating the firmware digest of the ECU 106 according to a second digest function and encrypting, by using a private key of the ECU 106, a digest obtained through calculation. The IVI 103 may decrypt the first signature information by using the public key of the ECU 106, calculate the firmware digest of the ECU 106 according to the second digest function, and verify whether the decrypted first signature information is consistent with a digest obtained by calculating the firmware digest of the ECU 106 according to the second digest function.

The domain controller in FIG. 1(b) may further have a capability of signing a firmware digest of an ECU. For example, the IVI 103 verifies that the decrypted first signature information is consistent with the digest obtained by calculating the firmware digest of the ECU 106 according to the second digest function, and the IVI 103 may calculate the firmware digest of the ECU 106 according to the third digest function, and encrypt, by using a private key of the IVI 103, a digest obtained through calculation.

The ECU in FIG. 1(b) may have a capability of signing a firmware digest of the ECU. For example, the ECU 106 may calculate the firmware digest of the ECU 106 according to the second digest function, and encrypt, by using the private key of the IVI 103, a digest obtained through calculation.

It should be understood that the architecture of the in-vehicle system 10 shown in FIG. 1(b) is merely used as an example, and is not intended to limit the technical solutions of this application. A person skilled in the art should understand that, in a specific implementation process, the in-vehicle system 10 may further include another device, for example, an on-board diagnostic (OBD) system. In addition, a quantity of gateways, a quantity of domain controllers, and a quantity of ECUs may also be determined according to a specific requirement.

The server 20 in FIG. 1(a) may have a capability of performing verification on firmware of an ECU. For example, the server 20 receives the first signature information, the public key of the ECU 106, and the firmware digest of the ECU 106 from the gateway 102, where the first signature information is obtained by calculating the firmware digest of the ECU 106 according to the second digest function and encrypting, by using the private key of the ECU 106, a digest obtained through calculation. The server 20 may decrypt the first signature information by using the public key of the ECU 106, calculate the firmware digest of the ECU 106 according to the second digest function, and verify whether the decrypted first signature information is consistent with a digest obtained by calculating the firmware digest of the ECU 106 according to the second digest function.

The server 20 in FIG. 1(a) may further have a capability of providing a service for a device in the in-vehicle system 10. For example, if the ECU 106 is used for navigation, after the server 20 verifies that the decrypted first signature information is consistent with the digest obtained by calculating the firmware digest of the ECU 106 according to the second digest function, the server 20 may provide a navigation service for the ECU 106.

It should be understood that the in-vehicle security protection system 100 shown in FIG. 1(a) is merely used as an example, and is not intended to limit the technical solutions of this application. A person skilled in the art should understand that in a specific implementation process, the in-vehicle security protection system 100 may further include another device, and a quantity of servers 20 and a quantity of in-vehicle systems 10 may also be determined based on a specific requirement. This is not limited.

Optionally, each device such as the gateway 102, the IVI 103, or the ECU 108 in FIG. 1(b) in the embodiments of this application may be a function module in a device. It may be understood that the function module may be an element in a hardware device, or may be a software function running on dedicated hardware, or may be a virtualization function instantiated on a platform (for example, a cloud platform).

Figure 2:
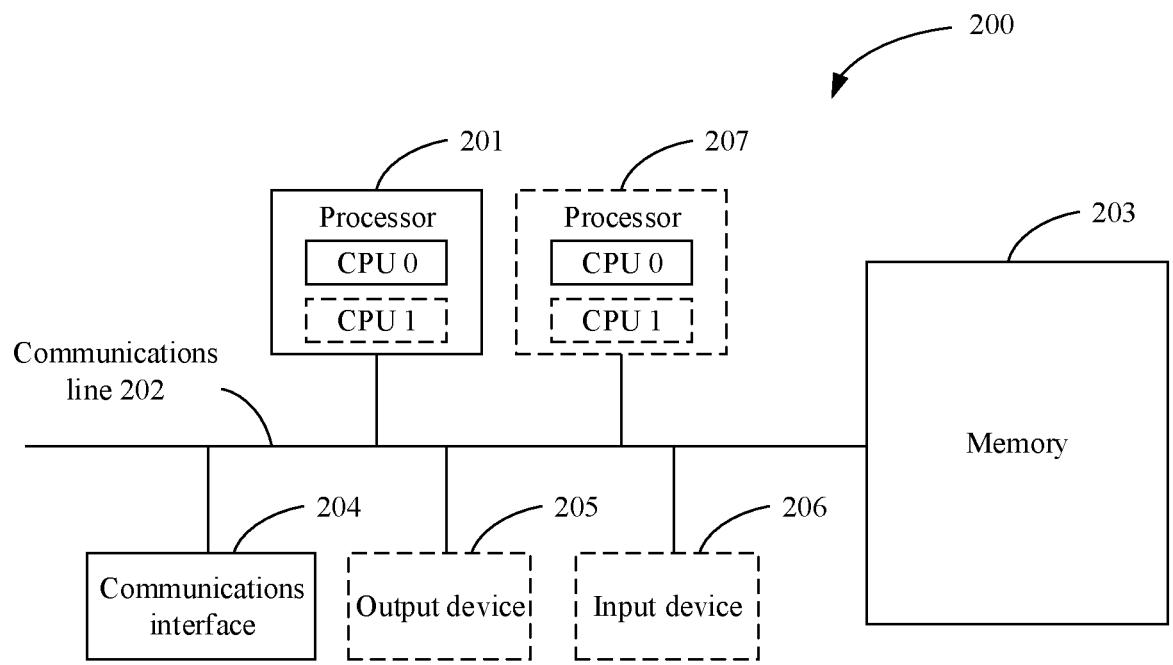
FIG. 2 is a schematic diagram of a hardware structure of a hardware device according to an embodiment of this application.

For example, each device in FIG. 1(b) may be implemented by using a hardware device 200 in FIG. 2. FIG. 2 is a schematic diagram of a hardware structure of a hardware device applicable to an embodiment of this application. The hardware device 200 may include at least one processor 201, a communications line 202, a memory 203, and at least one communications interface 204.

The processor 201 may be a general-purpose CPU, a microprocessor, an application-specific integrated circuit (ASIC), or one or more integrated circuits configured to control program execution in the solutions in this application.

The communications line 202 may include a path on which information is transferred between the foregoing components, for example, a bus.

The communications interface 204 is configured to communicate with another device or a communications network through any apparatus such as a transceiver, for example, an Ethernet interface, a radio access network (RAN) interface, or a wireless local area network (WLAN) interface.

The memory 203 may be a read-only memory (ROM) or another type of static storage device that can store static information and an instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory may exist independently, and is connected to the processor through the communications line 202. The memory may alternatively be integrated into the processor. The memory provided in the embodiments of this application may usually be non-volatile. The memory 203 is configured to store a computer executable instruction for executing the solutions of this application, and the processor 201 controls the execution. The processor 201 is configured to execute the computer executable instruction stored in the memory 203, to implement the method provided in the embodiments of this application.

Optionally, the computer executable instruction in the embodiments of this application may also be referred to as application program code. This is not specifically limited in the embodiments of this application.

During specific implementation, in an embodiment, the processor 201 may include one or more CPUs, for example, a CPU 0 and a CPU 1 in FIG. 2.

During specific implementation, in an embodiment, the hardware device 200 may include a plurality of processors, for example, the processor 201 and a processor 207 in FIG. 2. Each of the processors may be a single-core processor (single-CPU) or a multi-core processor (multi-CPU). The processor herein may be one or more devices, circuits, and/or processing cores configured to process data (for example, a computer program instruction).

During specific implementation, in an embodiment, the hardware device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensing device.

During specific implementation, the hardware device 200 may be an embedded device or a device having a structure similar to that in FIG. 2. A type of the hardware device 200 is not limited in the embodiments of this application.

The following specifically describes, with reference to FIG. 1(*a*), FIG. 1(*b*), and FIG. 2, the security protection method in an in-vehicle system provided in the embodiments of this application.

Figure 3A:
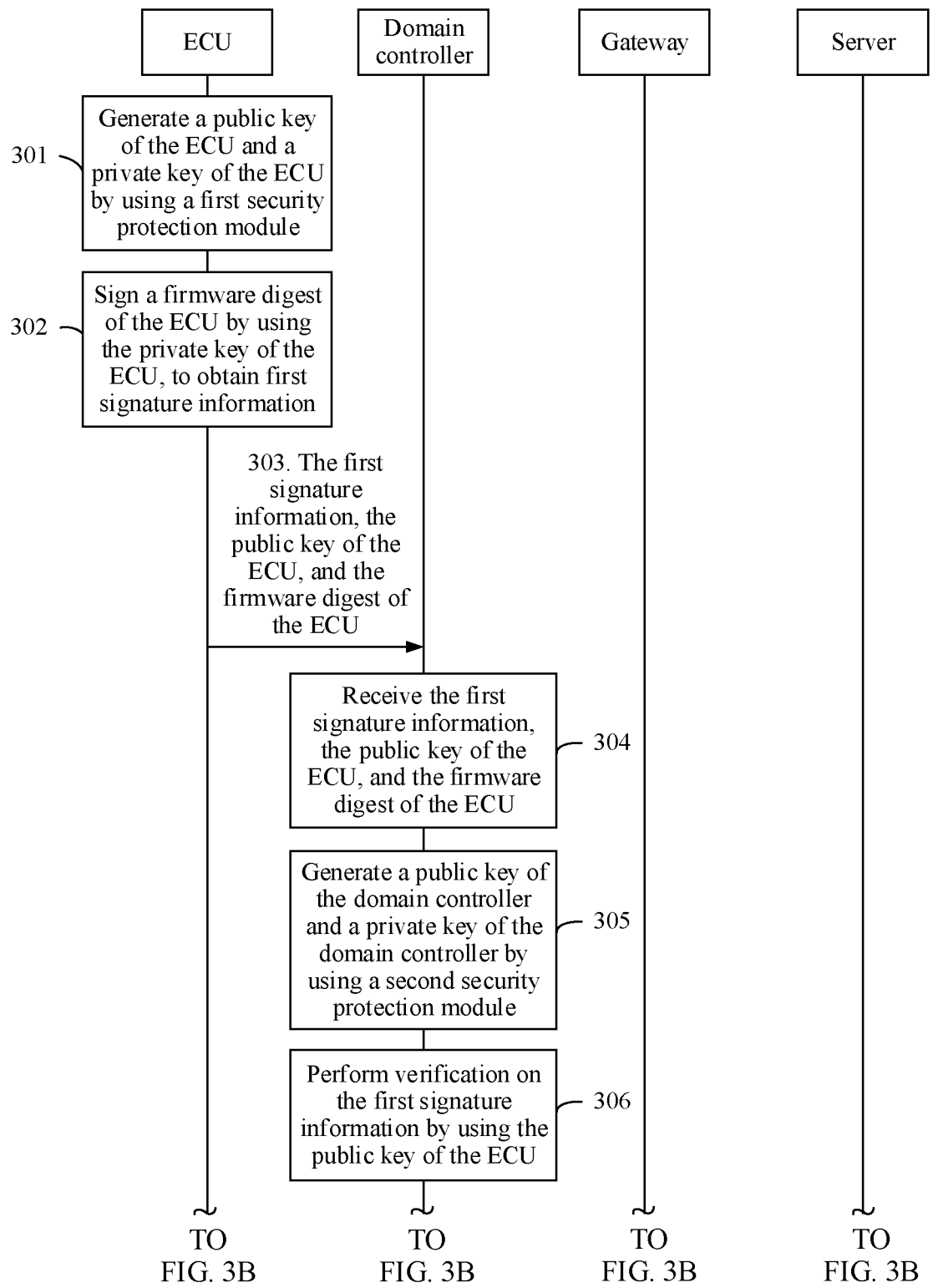
FIG. 3A to FIG. 3C are a schematic flowchart 1 of a security protection method in an in-vehicle system according to an embodiment of this application.
Figure 3B:
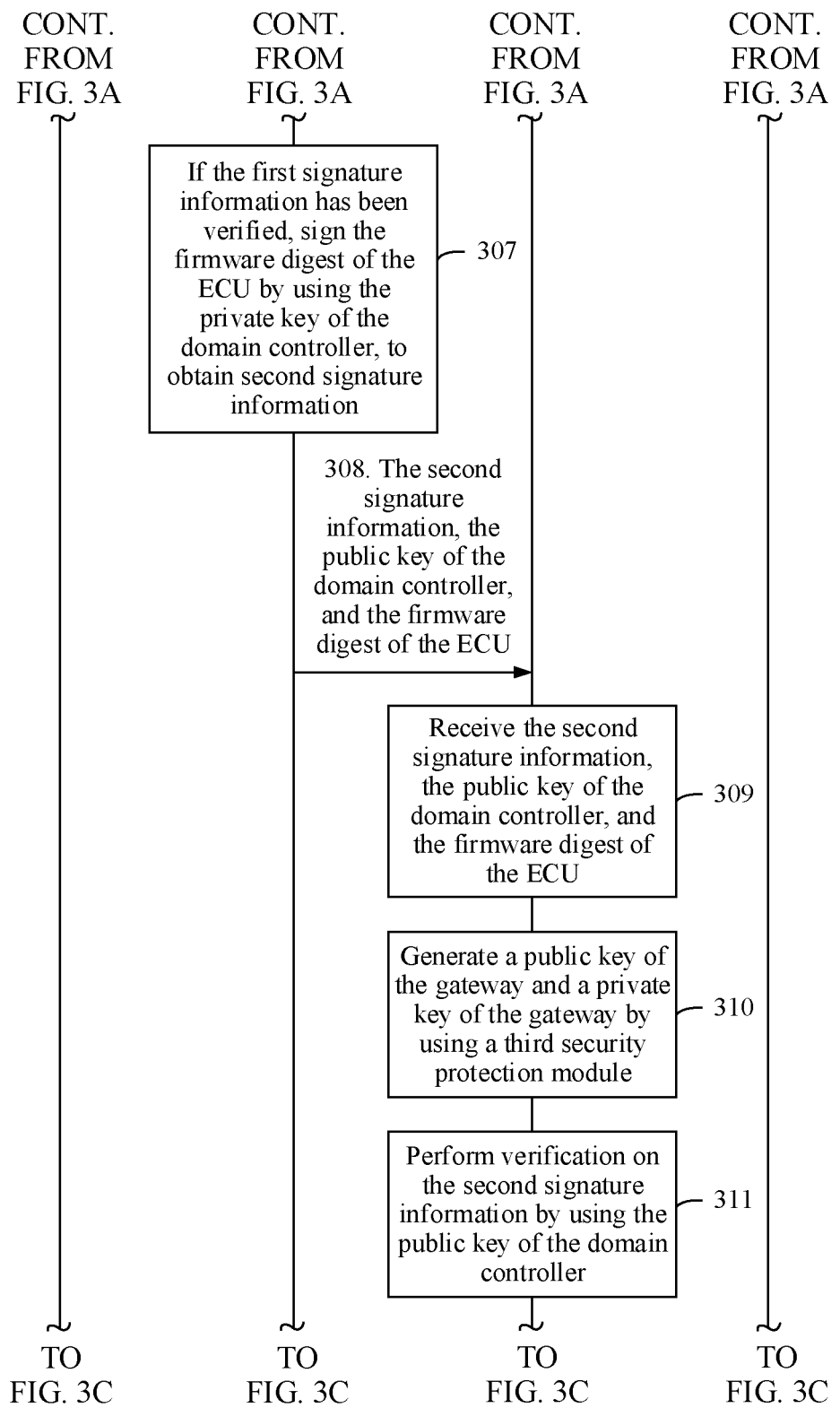
Figure 3C:
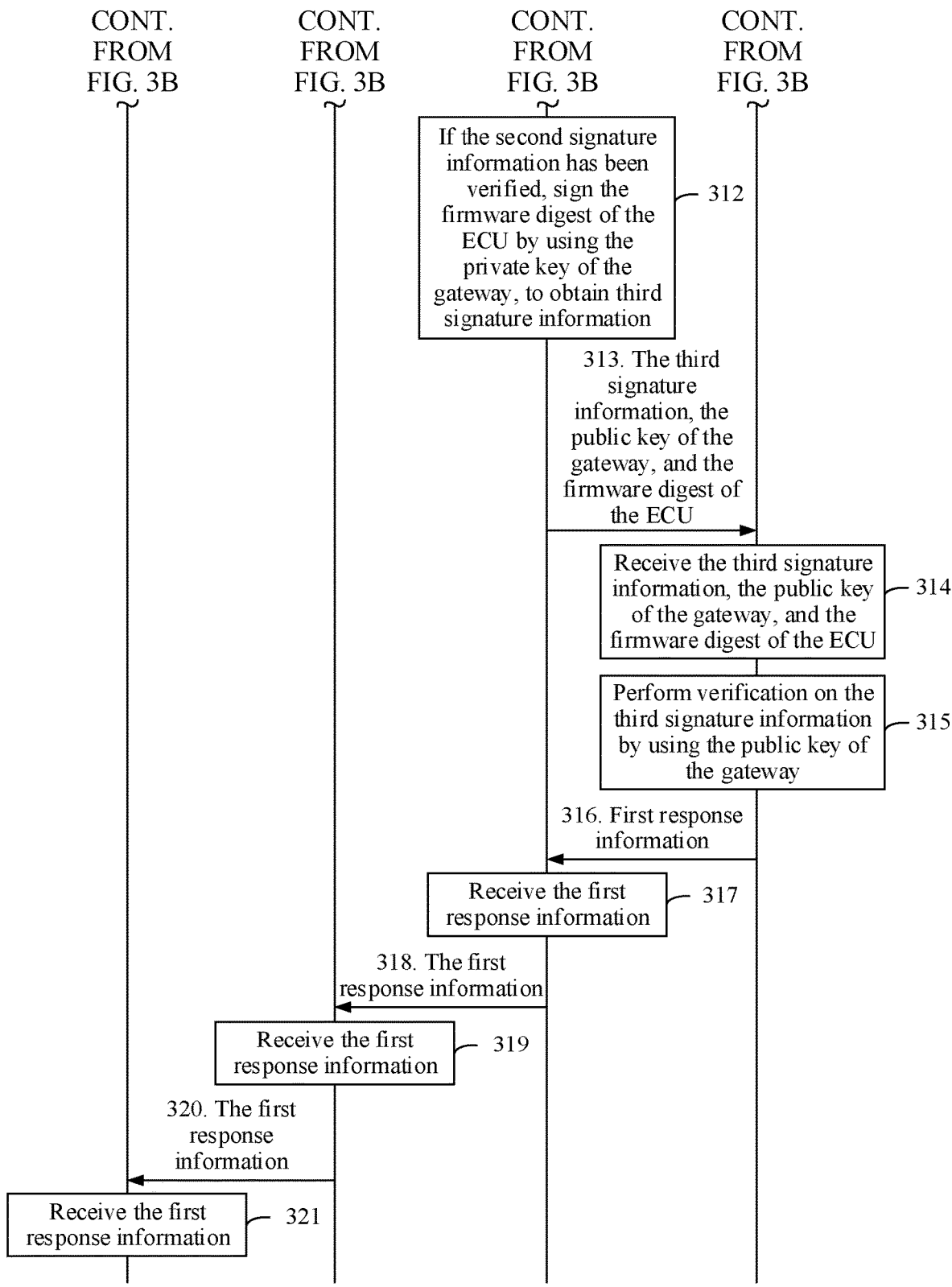

FIG. 3A to FIG. 3C show a security protection method in an in-vehicle system according to an embodiment of this application. The security protection method in an in-vehicle system includes step 301 to step 321.

Step 301: An ECU generates a public key of the ECU and a private key of the ECU by using a first security protection module.

The ECU may be the ECU 106 to the ECU 110 in FIG. 1(*b*).

The first security protection module may be deployed on the ECU, and the first security protection module may include a DICE. The first security protection module may be configured to provide security protection for the ECU, and a security level of the first security protection module is a first security level.

In a possible implementation, when a vehicle is started, the ECU generates the public key of the ECU and the private key of the ECU by using the first security protection module.

In a possible implementation, that an ECU generates a public key of the ECU and a private key of the ECU by using a first security protection module includes: The first security protection module deployed on the ECU generates the public key of the ECU and the private key of the ECU based on a unique device secret (UDS) of the ECU. The unique device secret of the ECU is a secret allocated by a manufacturer to each ECU.

Step 302: The ECU signs a firmware digest of the ECU by using the private key of the ECU, to obtain first signature information.

Firmware of the ECU may be described as static code of the ECU.

The firmware digest of the ECU may be obtained by calculating the firmware of the ECU according to a first digest function.

In a possible implementation, that the ECU signs a firmware digest of the ECU by using the private key of the ECU, to obtain first signature information includes: The ECU calculates the firmware digest of the ECU according to a second digest function, and then encrypts, by using the private key of the ECU, a digest through calculation, to obtain the first signature information.

The first digest function and the second digest function may be the same or may be different.

Step 303: The ECU sends the first signature information, the public key of the ECU, and the firmware digest of the ECU to a domain controller.

The domain controller is a domain controller connected to the ECU through the Ethernet or a CAN. For example, if the ECU is the ECU 106 or the ECU 107 in FIG. 1(*b*), the domain controller may be the IVI 103 in FIG. 1(*b*). If the ECU is the ECU 108 in FIG. 1(*b*), the domain controller may be the VCU 104 in FIG. 1(*b*). If the ECU is the ECU 109 or the ECU 110 in FIG. 1(*b*), the domain controller may be the ADAS 105 in FIG. 1(*b*).

Optionally, the domain controller stores an ECU list, and the ECU is an ECU in the list. The ECU in the ECU list performs the security protection method in an in-vehicle system provided in this embodiment of this application, and the ECU is connected to the domain controller.

In an actual application process, because the ECU in the ECU list needs to perform the security protection method in an in-vehicle system provided in this embodiment of this application, all the ECUs in the ECU list send the first signature information, the public key of the ECU, and the firmware digest of the ECU to the domain controller.

In a possible implementation, if the domain controller does not receive the first signature information, the public key of the ECU, and the firmware digest of the ECU from the ECU in the ECU list within a preset time after the vehicle is started, the domain controller sends first indication information to the ECU. The first indication information is used to indicate the ECU to perform the security protection method in an in-vehicle system provided in this embodiment of this application.

For example, the preset time is 2 seconds, the IVI 103 in FIG. 1(*b*) stores an ECU list, and the ECU list includes the ECU 106. In 2 seconds after the vehicle is started, the IVI 103 does not receive the first signature information, a public key of the ECU 106, and a firmware digest of the ECU 106 from the ECU 106, and the IVI 103 sends first indication information to the ECU 106. The first indication information is used to indicate the ECU 106 to perform the security protection method in an in-vehicle system provided in this embodiment of this application.

In another possible implementation, if the domain controller does not receive the first signature information, the public key of the ECU, and the firmware digest of the ECU from the ECU in the ECU list within a preset time after the vehicle is started, the domain controller sends second indication information to a server through a gateway. The second indication information is used to indicate not to provide a service for the ECU.

For example, the preset time is 2 seconds, the IVI 103 in FIG. 1(*b*) stores an ECU list, and the ECU list includes the ECU 106. In 2 seconds after the vehicle is started, the IVI 103 does not receive the first signature information, a public key of the ECU 106 and a firmware digest of the ECU 106 from the ECU 106, and the IVI 103 sends the second indication information to the gateway 102. After receiving the second indication information, the gateway 102 forwards (or transparently transmits) the second indication information to the server 20. The second indication information is used to indicate not to provide a service for the ECU 106.

Step 304: The domain controller receives the first signature information, the public key of the ECU, and the firmware digest of the ECU from the ECU.

Step 305: The domain controller generates a public key of the domain controller and a private key of the domain controller by using a second security protection module.

The second security protection module may be deployed on the domain controller, and the second security protection module may include a TPM-Thin, an eSE, a chip including a physically isolated security processor SP system, or a chip including a physically isolated HSM. The second security protection module may be configured to provide security protection for the domain controller, and a security level of the second security protection module is a second security level.

Optionally, the first security level is lower than the second security level.

In a possible implementation, when the vehicle is started, the domain controller generates the public key of the domain controller and the private key of the domain controller by using the second security protection module.

In another possible implementation, after receiving the first signature information, the public key of the ECU, and the firmware digest of the ECU from the ECU, the domain controller generates the public key of the domain controller and the private key of the domain controller by using the second security protection module.

In still another possible implementation, after the first signature information has been verified (that is, after step 306), the domain controller generates the public key of the domain controller and the private key of the domain controller by using the second security protection module.

In a possible implementation, that the domain controller generates a public key of the domain controller and a private key of the domain controller by using a second security protection module includes: The second security protection module deployed on the domain controller generates the public key of the domain controller and the private key of the domain controller based on a unique device secret of the domain controller. The unique device secret of the domain controller is a secret allocated by a manufacturer to each domain controller.

Step 306: The domain controller performs verification on the first signature information by using the public key of the ECU.

In a possible implementation, that the domain controller performs verification on the first signature information by using the public key of the ECU includes: The domain controller decrypts the first signature information by using the public key of the ECU, calculates the firmware digest of the ECU according to the second digest function, and then verifies whether the decrypted first signature information is consistent with a digest obtained by calculating the firmware digest of the ECU according to the second digest function. If the decrypted first signature information is consistent with the digest obtained by calculating the firmware digest of the ECU according to the second digest function, the first signature information has been verified. If the decrypted first signature information is inconsistent with the digest obtained by calculating the firmware digest of the ECU according to the second digest function, the first signature information fails to be verified.

In a possible implementation, if the first signature information fails to be verified, the domain controller sends a first verification failure message to the ECU, where the first verification failure message is used to indicate that the first signature information fails to be verified.

In a possible implementation, if the first signature information has been verified, the domain controller signs the firmware digest of the ECU by using the private key of the domain controller, to obtain second signature information, so that the gateway performs verification on the second signature information.

Step 307: If the first signature information has been verified, the domain controller signs the firmware digest of the ECU by using the private key of the domain controller, to obtain the second signature information.

In a possible implementation, that the domain controller signs the firmware digest of the ECU by using the private key of the domain controller, to obtain the second signature information includes: The domain controller calculates the firmware digest of the ECU according to a third digest function, and then encrypts, by using the private key of the domain controller, a digest obtained through calculation, to obtain the second signature information.

The first digest function, the second digest function, and the third digest function may be the same or may be different.

Step 308: The domain controller sends the second signature information, the public key of the domain controller, and the firmware digest of the ECU to the gateway.

The gateway may be the gateway 102 in FIG. 1(*b*).

Step 309: The gateway receives the second signature information, the public key of the domain controller, and the firmware digest of the ECU from the domain controller.

Step 310: The gateway generates a public key of the gateway and a private key of the gateway by using a third security protection module.

The third security protection module may be deployed on the gateway. The third security protection module may include a TPM-Rich, an eSE, or a chip including a physically isolated security processor SP system, or a chip including a physically isolated HSM. The third security protection module may be configured to provide security protection for the gateway, and a security level of the third security protection module is a third security level.

Optionally, the third security level is higher than or equal to the second security level, and the second security level is higher than the first security level.

In a possible implementation, when the vehicle is started, the gateway generates the public key of the gateway and the private key of the gateway by using the third security protection module.

In another possible implementation, after receiving the second signature information, the public key of the domain controller, and the firmware digest of the ECU from the domain controller, the gateway generates the public key of the gateway and the private key of the gateway by using the third security protection module.

In still another possible implementation, after the second signature information has been verified (that is, after step 311), the gateway generates the public key of the gateway and the private key of the gateway by using the third security protection module.

In a possible implementation, that the gateway generates a public key of the gateway and a private key of the gateway by using a third security protection module includes: The third security protection module deployed on the gateway generates the public key of the gateway and the private key of the gateway based on a unique device secret of the gateway. The unique device secret of the gateway is a secret allocated by a manufacturer to each gateway.

Step 311: The gateway performs verification on the second signature information by using the public key of the domain controller.

In a possible implementation, that the gateway performs verification on the first signature information by using the public key of the domain controller includes: The gateway decrypts the second signature information by using the public key of the domain controller, calculates the firmware digest of the ECU according to the third digest function, and then verifies whether the decrypted second signature information is consistent with a digest obtained by calculating the firmware digest of the ECU according to the third digest function. If the decrypted second signature information is consistent with the digest obtained by calculating the firmware digest of the ECU according to the third digest function, the second signature information has been verified. If the decrypted second signature information is inconsistent with the digest obtained by calculating the firmware digest of the ECU according to the third digest function, the second signature information fails to be verified.

In a possible implementation, if the second signature information fails to be verified, the gateway sends a second verification failure message to the domain controller. After receiving the second verification failure message, the domain controller forwards (or transparently transmits) the second verification failure message to the ECU. The second verification failure message is used to indicate that the second signature information fails to be verified.

In a possible implementation, if the second signature information has been verified, the gateway signs the firmware digest of the ECU by using the private key of the gateway, to obtain third signature information, so that the server performs verification on the third signature information.

Step 312: If the second signature information has been verified, the gateway signs the firmware digest of the ECU by using the private key of the gateway, to obtain the third signature information.

In a possible implementation, that the gateway signs the firmware digest of the ECU by using the private key of the gateway, to obtain the third signature information includes: The gateway calculates the firmware digest of the ECU according to a fourth digest function, and then encrypts, by using the private key of the gateway, a digest obtained through calculation, to obtain the third signature information.

The first digest function, the second digest function, the third digest function, and the fourth digest function may be the same or may be different.

Step 313: The gateway sends the third signature information, the public key of the gateway, and the firmware digest of the ECU to the server.

The server may be the server 20 in FIG. 1(a).

In a possible implementation, that the gateway sends the third signature information, the public key of the gateway, and the firmware digest of the ECU to the server includes: The gateway sends the third signature information, the public key of the gateway, and the firmware digest of the ECU to a T-Box. After receiving the third signature information, the public key of the gateway, and the firmware digest of the ECU, the T-Box forwards (or transparently transmits) the third signature information, the public key of the gateway, and the firmware digest of the ECU to the server.

The T-Box may be the T-Box 101 in FIG. 1(b).

Step 314: The server receives the third signature information, the public key of the gateway, and the firmware digest of the ECU from the gateway.

Step 315: The server performs verification on the third signature information by using the public key of the gateway.

Optionally, that the server performs verification on the third signature information by using the public key of the gateway includes: The server decrypts the third signature information by using the public key of the gateway, calculates the firmware digest of the ECU according to the fourth digest function, and then verifies whether the decrypted third signature information is consistent with a digest obtained by calculating the firmware digest of the ECU according to the fourth digest function. If the decrypted third signature information is consistent with the digest obtained by calculating the firmware digest of the ECU according to the fourth digest function, the third signature information has been verified. If the decrypted third signature information is inconsistent with the digest obtained by calculating the firmware digest of the ECU according to the fourth digest function, the third signature information fails to be verified.

In a possible implementation, if the third signature information has been verified, the server sends first response information to the gateway, where the first response information is used to indicate to start the ECU, so that the gateway forwards the first response information to the ECU, the ECU is started based on the first response information, and the server provides a service for the ECU. If the third signature information fails to be verified, the server sends second response information to the gateway, where the second response information is used to indicate to forbid to start the ECU, so that the gateway forwards the second response information to the ECU, and starting of the ECU is forbidden based on the second response information.

In another possible implementation, if the third signature information has been verified, the server sends first response information to the gateway, where the first response information is used to indicate to start the ECU, so that the gateway forwards the first response information to the ECU, the ECU is started based on the first response information, and the server provides a service for the ECU. If the third signature information fails to be verified, the server does not send response information to the gateway, and starting of the ECU is forbidden when the ECU does not receive the response information in a preset time.

It should be noted that the server may not send response information to the gateway when the third signature information has been verified or fails to be verified. Specifically, if the third signature information has been verified, the server provides a service for the ECU, or if the third signature information fails to be verified, the server does not provide a service for the ECU.

Step 316: If the third signature information has been verified, the server sends the first response information to the gateway.

In a possible implementation, that the server sends the first response information to the gateway includes: The server sends the first response information to the T-Box. After receiving the first response information, the T-Box forwards (or transparently transmits) the first response information to the gateway.

Step 317: The gateway receives the first response information from the server.

Step 318: The gateway sends the first response information to the domain controller.

Step 319: The domain controller receives the first response information from the gateway.

Step 320: The domain controller sends the first response information to the ECU.

Step 321: The ECU receives the first response information from the domain controller.

According to the method shown in FIG. 3A to FIG. 3C, the domain controller may perform, by using the public key of the ECU, verification on the first signature information obtained based on the firmware digest of the ECU. After the verification succeeds, the gateway may perform, by using the public key of the domain controller, verification on the second signature information obtained based on the firmware digest of the ECU. After the verification succeeds, the server may perform, by using the public key of the gateway, verification on the third signature information obtained based on the firmware digest of the ECU. After the verification succeeds, the server may send the first response information to the ECU through the gateway and the domain controller. Therefore, three-level verification may be performed on the firmware digest of the ECU, to ensure that the firmware of the ECU is not tampered with, thereby improving in-vehicle system security. In addition, the public key of the ECU and the private key of the ECU are generated by using the DICE, and complexity and costs of the DICE are low. Therefore, deploying the DICE on the ECU for verification on the firmware of the ECU can reduce costs.

In the method shown in FIG. 3A to FIG. 3C, alternatively, when the server performs verification after the domain controller and the gateway have verified the signature information of the firmware digest of the ECU, the ECU may directly send the signature information of the firmware digest of the ECU to the server for verification.

Figure 4A:
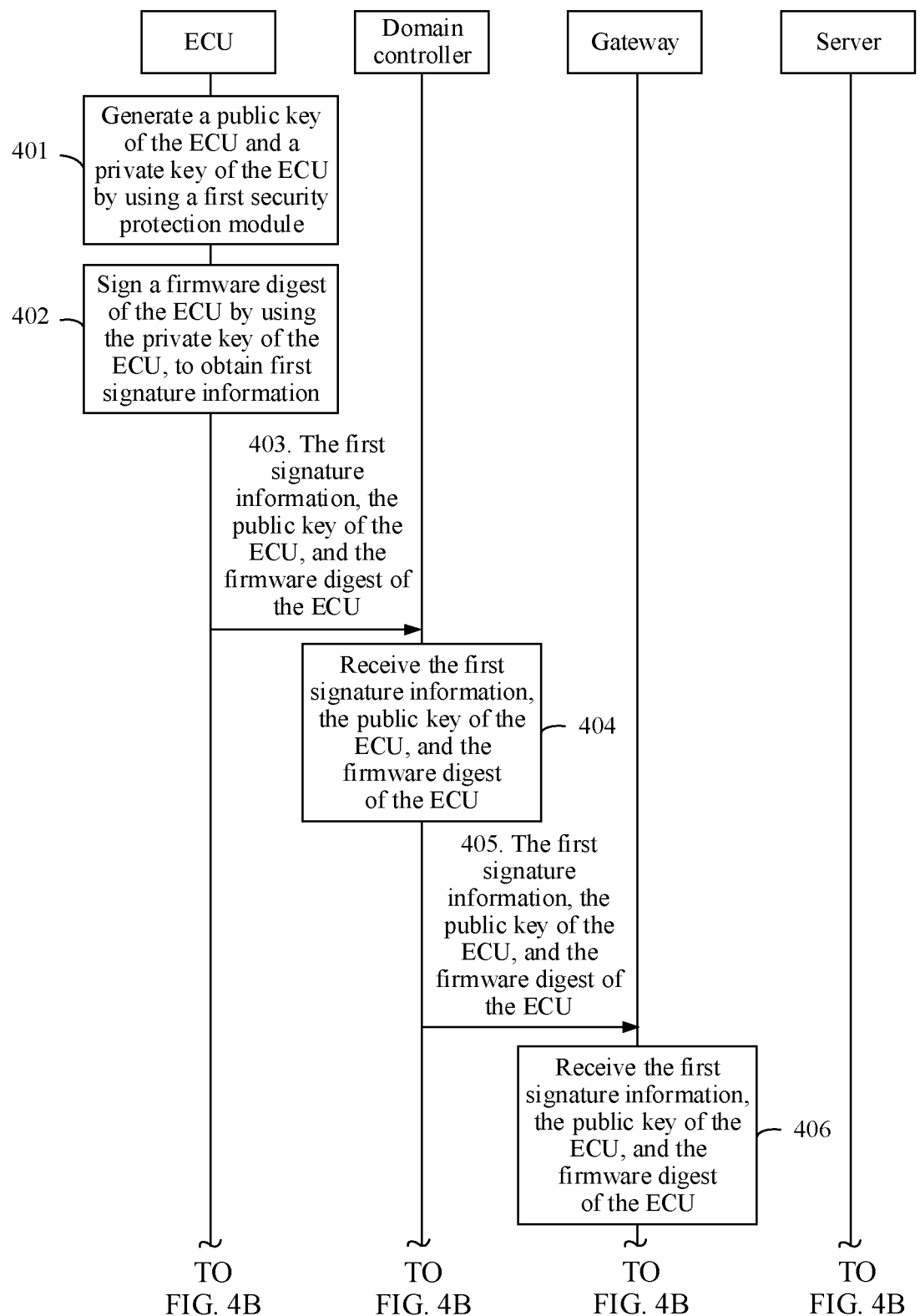
FIG. 4A and FIG. 4B are a schematic flowchart 2 of a security protection method in an in-vehicle system according to an embodiment of this application.
Figure 4B:
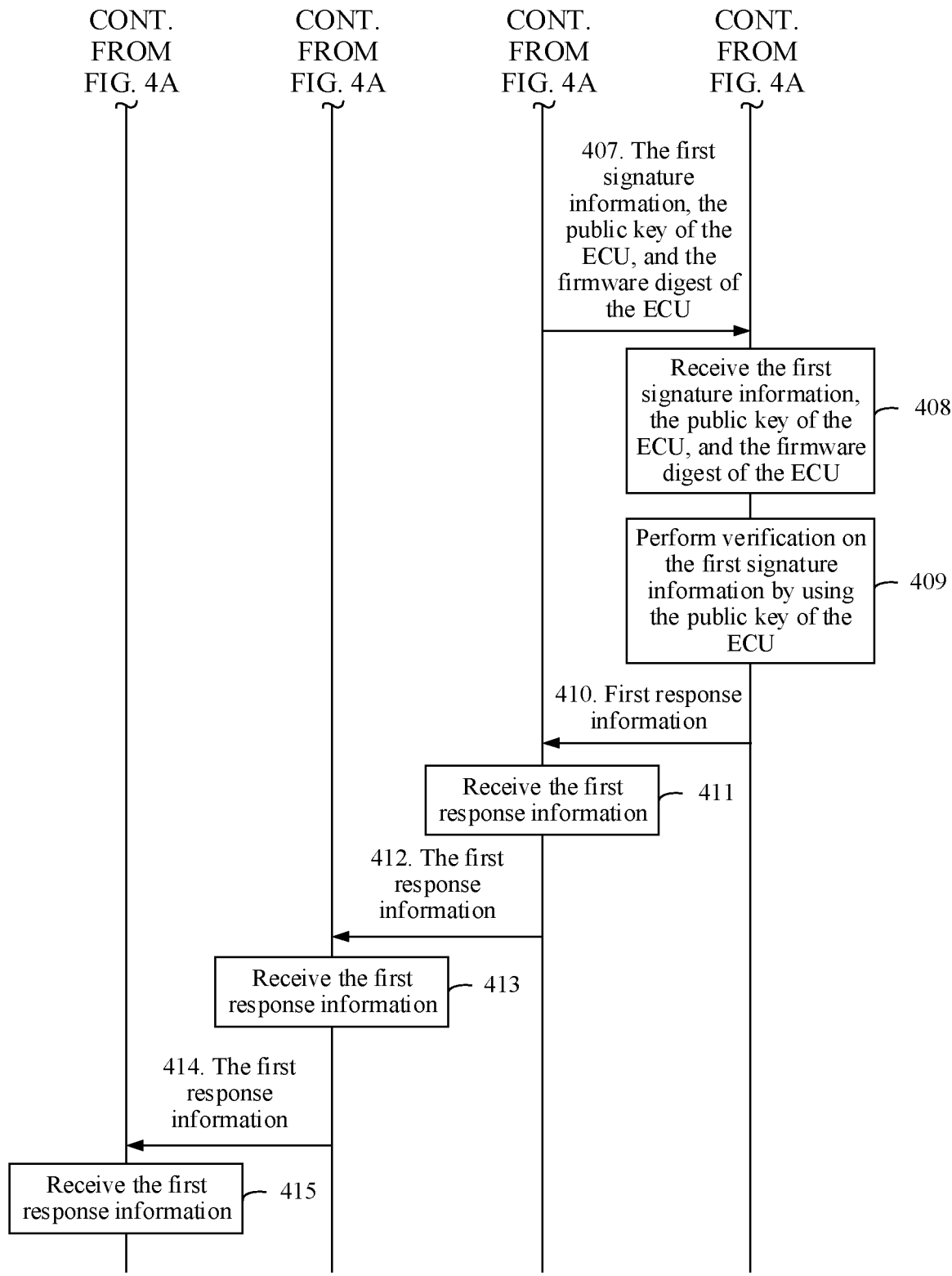

FIG. 4A and FIG. 4B show another security protection method in an in-vehicle system according to an embodiment of this application. The security protection method in an in-vehicle system includes step 401 to step 415.

Step 401: An ECU generates a public key of the ECU and a private key of the ECU by using a first security protection module.

Step 402: The ECU signs a firmware digest of the ECU by using the private key of the ECU, to obtain first signature information.

Step 403: The ECU sends the first signature information, the public key of the ECU, and the firmware digest of the ECU to a domain controller.

For a specific process of step 401 to step 403, refer to the descriptions of step 301 to step 303 in the method shown in FIG. 3A to FIG. 3C. Details are not described herein again.

Step 404: The domain controller receives the first signature information, the public key of the ECU, and the firmware digest of the ECU from the ECU.

Step 405: The domain controller sends the first signature information, the public key of the ECU, and the firmware digest of the ECU to a gateway.

The gateway may be the gateway 102 in FIG. 1(*b*).

Step 406: The gateway receives the first signature information, the public key of the ECU, and the firmware digest of the ECU from the domain controller.

Step 407: The gateway sends the first signature information, the public key of the ECU, and the firmware digest of the ECU to a server.

The server may be the server 20 in FIG. 1(*a*).

In a possible implementation, that the gateway sends the first signature information, the public key of the ECU, and the firmware digest of the ECU to a server includes: The gateway sends the first signature information, the public key of the ECU, and the firmware digest of the ECU to a T-Box. After receiving the first signature information, the public key of the ECU, and the firmware digest of the ECU, the T-Box forwards (or transparently transmits) the first signature information, the public key of the ECU, and the firmware digest of the ECU to the server.

The T-Box may be the T-Box 101 in FIG. 1(*b*).

Step 408: The server receives the first signature information, the public key of the ECU, and the firmware digest of the ECU from the gateway.

Step 409: The server performs verification on the first signature information by using the public key of the ECU.

Optionally, that the server performs verification on the first signature information by using the public key of the ECU includes: The server decrypts the first signature information by using the public key of the ECU, calculates the firmware digest of the ECU according to a second digest function, and then verifies whether the decrypted first signature information is consistent with a digest obtained by calculating the firmware digest of the ECU according to the second digest function. If the decrypted first signature information is consistent with the digest obtained by calculating the firmware digest of the ECU according to the second digest function, the first signature information has been verified. If the decrypted first signature information is inconsistent with the digest obtained by calculating the firmware digest of the ECU according to the second digest function, the first signature information fails to be verified.

In a possible implementation, if the first signature information has been verified, the server sends first response information to the gateway, where the first response information is used to indicate to start the ECU, so that the gateway forwards the first response information to the ECU, the ECU is started based on the first response information, and the server provides a service for the ECU. If the first signature information fails to be verified, the server sends second response information to the gateway, where the second response information is used to indicate to forbid to start the ECU, so that the gateway forwards the second response information to the ECU, and starting of the ECU is forbidden based on the second response information.

In another possible implementation, if the first signature information has been verified, the server sends first response information to the gateway, where the first response information is used to indicate to start the ECU, so that the gateway forwards the first response information to the ECU, the ECU is started based on the first response information, and the server provides a service for the ECU. If the first signature information fails to be verified, the server does not send response information to the gateway, and starting of the ECU is forbidden when the ECU does not receive the response information in a preset time.

It should be noted that the server may not send response information to the gateway when the first signature information has been verified or fails to be verified. Specifically, if the first signature information has been verified, the server provides a service for the ECU, or if the first signature information fails to be verified, the server does not provide a service for the ECU.

Step 410: If the first signature information has been verified, the server sends the first response information to the gateway.

In a possible implementation, that the server sends the first response information to the gateway includes: The server sends the first response information to the T-Box. After receiving the first response information, the T-Box forwards (or transparently transmits) the first response information to the gateway.

Step 411: The gateway receives the first response information from the server.

Step 412: The gateway sends the first response information to the domain controller.

Step 413: The domain controller receives the first response information from the gateway.

Step 414: The domain controller sends the first response information to the ECU.

Step 415: The ECU receives the first response information from the domain controller.

According to the method shown in FIG. 4A and FIG. 4B, the ECU may send, to the server through the domain controller and the gateway, the first signature information obtained based on the firmware digest of the ECU, and the server may perform verification on the first signature information by using the public key of the ECU, to ensure that firmware of the ECU is not tampered with, thereby improving in-vehicle system security. In addition, the public key of the ECU and the private key of the ECU are generated by using a DICE, and complexity and costs of the DICE are low. Therefore, deploying the DICE on the ECU for verification on the firmware of the ECU can reduce costs.

The foregoing mainly describes the solutions provided in the embodiments of this application from a perspective of interaction between the network elements. It may be understood that, to implement the foregoing functions, the foregoing in-vehicle system, the ECU, the domain controller, the gateway, or the like includes corresponding hardware structures and/or software modules for performing the functions. A person of ordinary skill in the art should easily be aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In the embodiments of this application, the in-vehicle security protection system, the ECU, the domain controller, or the gateway may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 5:
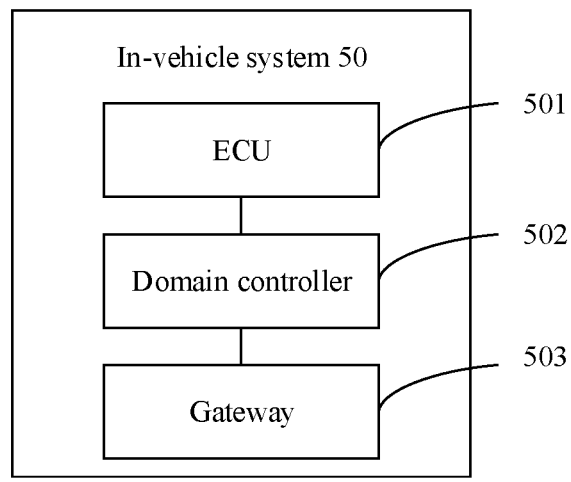
FIG. 5 is a schematic structural diagram of an in-vehicle system according to an embodiment of this application.

For example, when the function modules are divided through integration, FIG. 5 is a schematic structural diagram of an in-vehicle system 50. The in-vehicle system 50 includes an ECU 501, a domain controller 502, and a gateway 503.

A first security protection module may be deployed on the ECU 501, the first security protection module may be configured to provide security protection for the ECU 501, and a security level of the first security protection module is a first security level.

A second security protection module may be deployed on the domain controller 502, the second security protection module may be configured to provide security protection for the domain controller 502, and a security level of the second security protection module is a second security level.

A third security protection module may be deployed on the gateway 503, the third security protection module may be configured to provide security protection for the gateway 503, and a security level of the third security protection module is a third security level.

Figure 6:
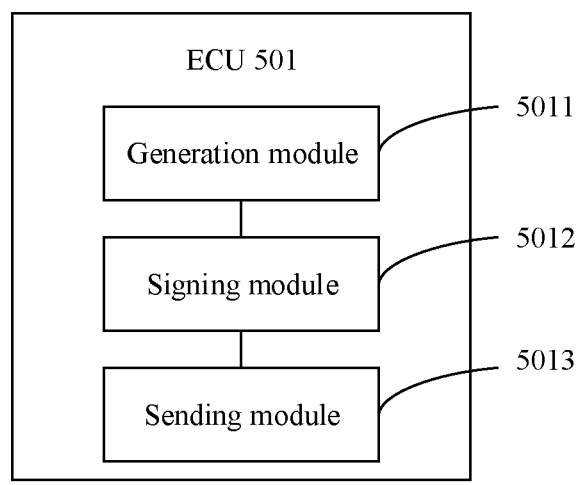
FIG. 6 is a schematic structural diagram 1 of an ECU according to an embodiment of this application.

When the function modules are divided through integration, FIG. 6 is a schematic structural diagram of the ECU 501. The ECU 501 includes a generation module 5011, a signing module 5012, and a sending module 5013.

The generation module 5011 is configured to generate a public key of the ECU and a private key of the ECU by using the first security protection module.

The signing module 5012 is configured to sign a firmware digest of the ECU by using the private key of the ECU, to obtain first signature information, where the firmware digest of the ECU is obtained by calculating firmware of the ECU according to a first digest function.

The sending module 5013 is configured to send the first signature information, the public key of the ECU, and the firmware digest of the ECU to the domain controller.

Optionally, the second security protection module is deployed on the domain controller, the second security protection module is configured to provide security protection for the domain controller, and the security level of the second security protection module is the second security level.

Optionally, the first security protection module includes a device identifier composition engine DICE. The second security protection module includes a trusted platform module-thin TPM-Thin, an embedded secure element eSE, a chip including a physically isolated security processor SP system, or a chip including a physically isolated HSM.

Optionally, the domain controller stores an ECU list, and the ECU is an ECU in the list.

Figure 7:
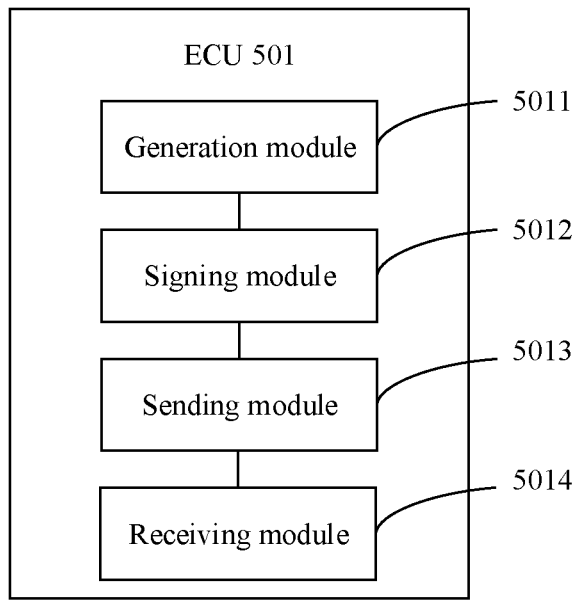
FIG. 7 is a schematic structural diagram 2 of an ECU according to an embodiment of this application.

Optionally, as shown in FIG. 7, the ECU 501 further includes a receiving module 5014. The receiving module 5014 is configured to receive first response information from the domain controller, where the first response information is used to indicate to start the ECU.

All related content of the operations in the foregoing method embodiment may be cited in function descriptions of corresponding function modules. Details are not described herein again.

In this embodiment, the ECU 501 may be presented in the form of function modules obtained through division in an integrated manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the ECU 501 may be in a form shown in FIG. 2.

For example, the processor 201 in FIG. 2 may invoke the computer executable instruction stored in the memory 203, so that the ECU 501 performs the security protection method in an in-vehicle system in the foregoing method embodiments.

For example, functions/implementation processes of the generation module 5011, the signing module 5012, the sending module 5013, and the receiving module 5014 in FIG. 7 may be implemented by the processor 201 in FIG. 2 by invoking the computer executable instruction stored in the memory 203. Alternatively, functions/implementation processes of the generation module 5011 and the signing module 5012 in FIG. 7 may be implemented by the processor 201 in FIG. 2 by invoking the computer executable instruction stored in the memory 203, and functions/implementation processes of the sending module 5013 and the receiving module 5014 in FIG. 7 may be implemented by the communications interface 204 in FIG. 2.

The ECU 501 provided in this embodiment of this application may perform the security protection method in an in-vehicle system. Therefore, for technical effects that can be obtained by the ECU 501, refer to the foregoing method embodiments. Details are not described herein again.

Figure 8:
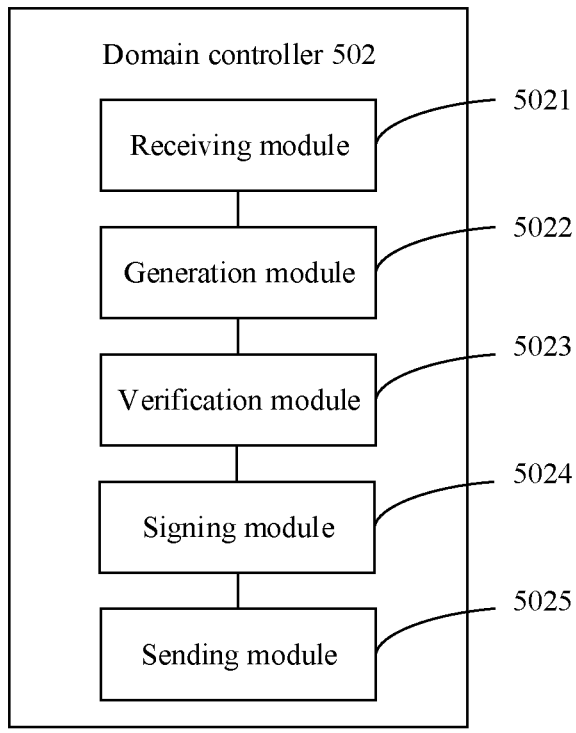
FIG. 8 is a schematic structural diagram 1 of a domain controller according to an embodiment of this application.

If the function modules are divided through integration, FIG. 8 is a schematic structural diagram of the domain controller 502. The domain controller 502 includes a receiving module 5021, a generation module 5022, a verification module 5023, a signing module 5024, and a sending module 5025.

The receiving module 5021 is configured to receive first signature information, a public key of the electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function.

The generation module 5022 is configured to generate a public key of the domain controller and a private key of the domain controller by using the second security protection module.

The verification module 5023 is configured to perform verification on the first signature information by using the public key of the ECU.

The signing module 5024 is configured to: if the first signature information has been verified, sign the firmware digest of the ECU by using the private key of the domain controller, to obtain second signature information.

The sending module 5025 is configured to send the second signature information, the public key of the domain controller, and the firmware digest of the ECU to the gateway.

Optionally, the first security protection module is deployed on the ECU, the first security protection module is configured to provide security protection for the ECU, and the security level of the first security protection module is the first security level. The third security protection module is deployed on the gateway, the third security protection module is configured to provide security protection for the gateway, and the security level of the third security protection module is the third security level.

Optionally, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM.

Optionally, the domain controller stores an ECU list, and the ECU is an ECU in the list.

Optionally, the receiving module 5021 is further configured to receive first response information from the gateway, where the first response information is used to indicate to start the ECU. The sending module 5025 is further configured to send the first response information to the ECU.

All related content of the operations in the foregoing method embodiment may be cited in function descriptions of corresponding function modules. Details are not described herein again.

In this embodiment, the domain controller 502 may be presented in the form of function modules obtained through division in an integrated manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the domain controller 502 may be in a form shown in FIG. 2.

For example, the processor 201 in FIG. 2 may invoke the computer executable instruction stored in the memory 203, so that the domain controller 502 performs the security protection method in an in-vehicle system in the foregoing method embodiments.

For example, functions/implementation processes of the receiving module 5021, the generation module 5022, the verification module 5023, the signing module 5024, and the sending module 5025 in FIG. 8 may be implemented by the processor 201 in FIG. 2 by invoking the computer executable instruction stored in the memory 203. Alternatively, functions/implementation processes of the generation module 5022, the verification module 5023, and the signing module 5024 in FIG. 8 may be implemented by the processor 201 in FIG. 2 by invoking the computer executable instruction stored in the memory 203, and functions/implementation processes of the receiving module 5021 and the sending module 5025 in FIG. 8 may be implemented by the communications interface 204 in FIG. 2.

The domain controller 502 provided in this embodiment of this application may perform the security protection method in an in-vehicle system. Therefore, for technical effects that can be obtained by the domain controller 502, refer to the foregoing method embodiments. Details are not described herein again.

Figure 9:
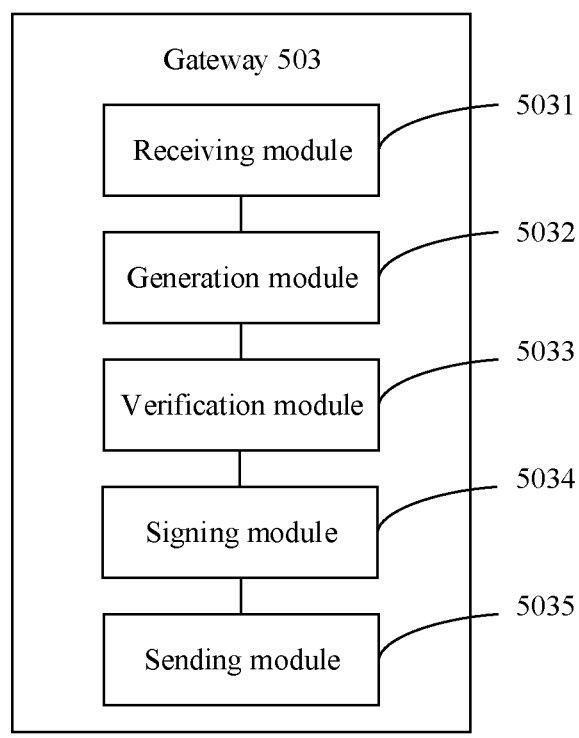
FIG. 9 is a schematic structural diagram 1 of a gateway according to an embodiment of this application.

If the function modules are divided through integration, FIG. 9 is a schematic structural diagram of the gateway 503. The gateway 503 includes a receiving module 5031, a generation module 5032, a verification module 5033, a signing module 5034, and a sending module 5035.

The receiving module 5031 is configured to receive second signature information, a public key of the domain controller, and a firmware digest of the ECU from the domain controller, where the second signature information is obtained by signing the firmware digest of the ECU by using a private key of the domain controller, and the firmware digest of the ECU is obtained by calculating firmware of the ECU according to a first digest function.

The generation module 5032 is configured to generate a public key of the gateway and a private key of the gateway by using the third security protection module.

The verification module 5033 is configured to perform verification on the second signature information by using the public key of the domain controller.

The signing module 5034 is configured to: if the second signature information has been verified, sign the firmware digest of the ECU by using the private key of the gateway, to obtain third signature information.

The sending module 5035 is configured to send the third signature information, the public key of the gateway, and the firmware digest of the ECU to a server.

Optionally, the second security protection module is deployed on the domain controller, the second security protection module is configured to provide security protection for the domain controller, and the security level of the second security protection module is the second security level.

Optionally, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM.

Optionally, the domain controller stores an ECU list, and the ECU is an ECU in the list.

Optionally, the receiving module 5031 is further configured to receive first response information from the server, where the first response information is used to indicate to start the ECU. The sending module 5035 is further configured to send the first response information to the domain controller.

All related content of the operations in the foregoing method embodiment may be cited in function descriptions of corresponding function modules. Details are not described herein again.

In this embodiment, the gateway 503 may be presented in the form of function modules obtained through division in an integrated manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the gateway 503 may be in a form shown in FIG. 2.

For example, the processor 201 in FIG. 2 may invoke the computer executable instruction stored in the memory 203, so that the gateway 503 performs the security protection method in an in-vehicle system in the foregoing method embodiments.

For example, functions/implementation processes of the receiving module 5031, the generation module 5032, the verification module 5033, the signing module 5034, and the sending module 5035 in FIG. 9 may be implemented by the processor 201 in FIG. 2 by invoking the computer executable instruction stored in the memory 203. Alternatively, functions/implementation processes of the generation module 5032, the verification module 5033, and the signing module 5034 in FIG. 9 may be implemented by the processor 201 in FIG. 2 by invoking the computer executable instruction stored in the memory 203, and functions/implementation processes of the receiving module 5031 and the sending module 5035 in FIG. 9 may be implemented by the communications interface 204 in FIG. 2.

The gateway 503 provided in this embodiment of this application may perform the security protection method in an in-vehicle system. Therefore, for technical effects that can be obtained by the gateway 503, refer to the foregoing method embodiments. Details are not described herein again.

Figure 10:
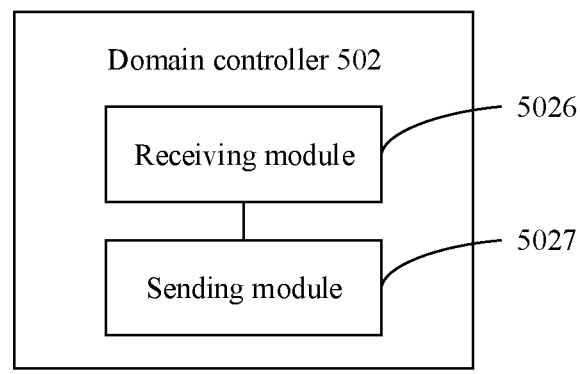
FIG. 10 is a schematic structural diagram 2 of a domain controller according to an embodiment of this application.

If the function modules are divided through integration, FIG. 10 is another schematic structural diagram of the domain controller 502. The domain controller 502 includes a receiving module 5026 and a sending module 5027.

The receiving module 5026 is configured to receive first signature information, a public key of the electronic control unit ECU, and a firmware digest of the ECU from the ECU, where the first signature information is obtained by signing the firmware digest of the ECU by using a private key of the ECU, and the firmware digest of the ECU is obtained by calculating firmware of the ECU according to a first digest function.

The sending module 5027 is configured to send the first signature information, the public key of the ECU, and the firmware digest of the ECU to the gateway.

Optionally, the first security protection module is deployed on the ECU, the first security protection module is configured to provide security protection for the ECU, and the security level of the first security protection module is the first security level. The third security protection module is deployed on the gateway, the third security protection module is configured to provide security protection for the gateway, and the security level of the third security protection module is the third security level.

Optionally, the first security protection module includes a device identifier composition engine DICE. The second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM.

Optionally, the domain controller stores an ECU list, and the ECU is an ECU in the list.

Optionally, the receiving module 5026 is configured to receive first response information from the gateway, where the first response information is used to indicate to start the ECU. The sending module 5027 is configured to send the first response information to the ECU.

All related content of the operations in the foregoing method embodiment may be cited in function descriptions of corresponding function modules. Details are not described herein again.

In this embodiment, the domain controller 502 may be presented in the form of function modules obtained through division in an integrated manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the domain controller 502 may be in a form shown in FIG. 2.

For example, the processor 201 in FIG. 2 may invoke the computer executable instruction stored in the memory 203, so that the domain controller 502 performs the security protection method in an in-vehicle system in the foregoing method embodiments.

For example, functions/implementation processes of the receiving module 5026 and the sending module 5027 in FIG. 10 may be implemented by the processor 201 in FIG. 2 by invoking the computer executable instruction stored in the memory 203. Alternatively, functions/implementation processes of the receiving module 5026 and the sending module 5027 in FIG. 10 may be implemented by the communications interface 204 in FIG. 2.

The domain controller 502 provided in this embodiment of this application may perform the security protection method in an in-vehicle system. Therefore, for technical effects that can be obtained by the domain controller 502, refer to the foregoing method embodiments. Details are not described herein again.

Figure 11:
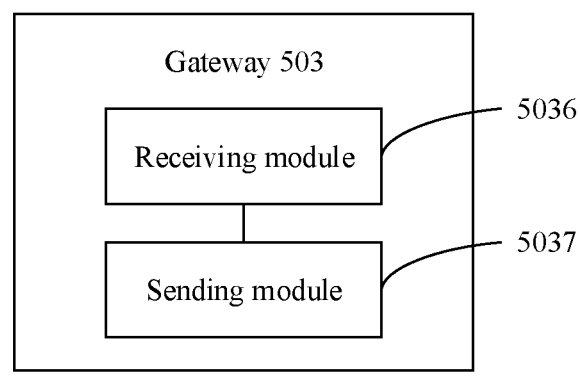
FIG. 11 is a schematic structural diagram 2 of a gateway according to an embodiment of this application.

If the function modules are divided through integration, FIG. 11 is another schematic structural diagram of the gateway 503. The gateway 503 includes a receiving module 5036 and a sending module 5037.

The receiving module 5036 is configured to receive first signature information, a public key of the ECU, and a firmware digest of the ECU from the domain controller, where the first signature information is obtained by signing the firmware digest of the ECU by using a private key of the ECU, and the firmware digest of the ECU is obtained by calculating firmware of the ECU according to a first digest function.

The sending module 5037 is configured to send the first signature information, the public key of the ECU, and the firmware digest of the ECU to a server.

Optionally, the second security protection module is deployed on the domain controller, the second security protection module is configured to provide security protection for the domain controller, and the security level of the second security protection module is the second security level.

Optionally, the second security protection module includes a trusted platform module-thin TPM-Thin, an embedded secure element eSE, a chip including a physically isolated security processor SP system, or a chip including a physically isolated hardware security module HSM. The third security protection module includes a trusted platform module-rich TPM-Rich, an eSE, a chip including a physically isolated SP system, or a chip including a physically isolated HSM.

Optionally, the domain controller stores an ECU list, and the ECU is an ECU in the list.

Optionally, the receiving module 5036 is configured to receive first response information from the server, where the first response information is used to indicate to start the ECU. The sending module 5037 is configured to send the first response information to the domain controller.

All related content of the operations in the foregoing method embodiment may be cited in function descriptions of corresponding function modules. Details are not described herein again.

In this embodiment, the gateway 503 may be presented in the form of function modules obtained through division in an integrated manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the gateway 503 may be in a form shown in FIG. 2.

For example, the processor 201 in FIG. 2 may invoke the computer executable instruction stored in the memory 203, so that the gateway 503 performs the security protection method in an in-vehicle system in the foregoing method embodiments.

For example, functions/implementation processes of the receiving module 5036 and the sending module 5037 in FIG. 11 may be implemented by the processor 201 in FIG. 2 by invoking the computer executable instruction stored in the memory 203. Alternatively, functions/implementation processes of the receiving module 5036 and the sending module 5037 in FIG. 11 may be implemented by the communications interface 204 in FIG. 2.

The gateway 503 provided in this embodiment of this application may perform the security protection method in an in-vehicle system. Therefore, for technical effects that can be obtained by the gateway 503, refer to the foregoing method embodiments. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the appended claims. In the claims, "comprise" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. An in-vehicle security protection system, comprising:
an electronic control unit (ECU);
a domain controller coupled to the ECU; and
a gateway coupled to the domain controller,
wherein the ECU is configured to generate a public key of the ECU and a private key of the ECU by using a first security protection module deployed on the ECU, wherein the first security protection module is configured to provide security protection for the ECU, and a security level of the first security protection module is a first security level,
wherein the ECU is further configured to sign a firmware digest of the ECU by using the private key of the ECU to obtain first signature information,
wherein the ECU is further configured to send the first signature information, the public key of the ECU, and the firmware digest of the ECU to the domain controller,
wherein the domain controller is configured to receive the first signature information, the public key of the ECU, and the firmware digest of the ECU from the ECU,
wherein the domain controller is further configured to generate a public key of the domain controller and a private key of the domain controller by using a second security protection module, wherein the second security protection module is configured to provide security protection for the domain controller, and a security level of the second security protection module is a second security level,
wherein the domain controller is further configured to perform verification on the first signature information by using the public key of the ECU,
wherein the domain controller is further configured to, when the first signature information has been verified, sign the firmware digest of the ECU by using the private key of the domain controller, to obtain second signature information,
wherein the domain controller is further configured to send the second signature information, the public key of the domain controller, and the firmware digest of the ECU to the gateway,
wherein the gateway is configured to receive the second signature information, the public key of the domain controller, and the firmware digest of the ECU from the domain controller,
wherein the gateway is further configured to generate a public key of the gateway and a private key of the gateway by using a third security protection module, wherein the third security protection module is configured to provide security protection for the gateway, and a security level of the third security protection module is a third security level,
wherein the gateway is further configured to perform verification on the second signature information by using the public key of the domain controller,
wherein the gateway is further configured to, when the second signature information has been verified, sign the firmware digest of the ECU by using the private key of the gateway, to obtain third signature information, and
wherein the gateway is further configured to send the third signature information, the public key of the gateway, and the firmware digest of the ECU to a server external to the in-vehicle security protection system.

2. The in-vehicle security protection system according to claim 1, wherein the third security level is higher than or equal to the second security level, and the second security level is higher than the first security level.

3. The in-vehicle security protection system according to claim 1, wherein
the first security protection module comprises a device identifier composition engine (DICE),
the second security protection module comprises a trusted platform module-thin, an embedded secure element (eSE), a chip comprising a physically isolated security processor (SP) system, or a chip comprising a physically isolated hardware security module (HSM), and
the third security protection module comprises a trusted platform module-rich, an (eSE), a chip comprising a physically isolated SP system, or a chip comprising a physically isolated HSM.

4. The in-vehicle security protection system according to claim 1, wherein the domain controller stores an ECU list, and the ECU is in the ECU list.

5. The in-vehicle security protection system according to claim 1, wherein the firmware digest of the ECU is obtained by calculating firmware of the ECU according to a first digest function.

6. The in-vehicle security protection system according to claim 1, wherein the in-vehicle security protection system further comprises the server,
wherein the server is configured to receive the third signature information, the public key of the gateway, and the firmware digest of the ECU from the gateway,
wherein the server is further configured to perform verification on the third signature information by using the public key of the gateway,
wherein the server is further configured to: if the third signature information has been verified, send first response information to the gateway, wherein the first response information is used to indicate to start the ECU,
wherein the gateway is further configured to receive the first response information from the server,
wherein the gateway is further configured to send the first response information to the domain controller,
wherein the domain controller is further configured to receive the first response information from the gateway,
wherein the domain controller is further configured to send the first response information to the ECU, and
wherein the ECU is further configured to receive the first response information from the domain controller.

7. A method, comprising:
generating, by an electronic control unit (ECU) of an in-vehicle security protection system, a public key of the ECU and a private key of the ECU by using a first security protection module deployed on the ECU, wherein the first security protection module is configured to provide security protection for the ECU, and a security level of the first security protection module is a first security level;

signing, by the ECU, a firmware digest of the ECU by using the private key of the ECU to obtain first signature information;

sending, by the ECU, the first signature information, the public key of the ECU, and the firmware digest of the ECU to a domain controller of the in-vehicle security protection system coupled to the ECU;

receiving, by the domain controller, the first signature information, the public key of the ECU, and the firmware digest of the ECU from the ECU;

generating, bythe domain controller, a public key of the domain controller and a private key of the domain controller by using a second security protection module, wherein the second security protection module is configured to provide security protection for the domain controller, and a security level of the second security protection module is a second security level;

performing, by the domain controller, verification on the first signature information by using the public key of the ECU;

when the first signature information has been verified, signing, by the domain controller, the firmware digest of the ECU by using the private key of the domain controller, to obtain second signature information;

sending, by the domain controller, the second signature information, the public key of the domain controller, and the firmware digest of the ECU to a gateway of the in-vehicle security protection system coupled to the domain controller;

receiving, by the gateway, the second signature information, the public key of the domain controller, and the firmware digest of the ECU from the domain controller;

generating, by the gateway, a public key of the gateway and a private key of the gateway by using a third security protection module, wherein the third security protection module is configured to provide security protection for the gateway, and a security level of the third security protection module is a third security level;

performing, by the gateway, verification on the second signature information by using the public key of the domain controller;

when the second signature information has been verified, signing, by the gateway, the firmware digest of the ECU by using the private key of the gateway, to obtain third signature information; and sending, by the gateway, the third signature information, the public key of the gateway, and the firmware digest of the ECU to a server external to the in-vehicle security protection system.

8. The method according to claim 7, wherein the third security level is higher than or equal to the second security level, and the second security level is higher than the first security level.

9. The method according to claim 7, wherein
the first security protection module comprises a device identifier composition engine (DICE),
the second security protection module comprises a trusted platform module-thin, an embedded secure element (eSE), a chip comprising a physically isolated security processor (SP) system, or a chip comprising a physically isolated hardware security module (HSM), and the third security protection module comprises a trusted platform module-rich, an (eSE), a chip comprising a physically isolated SP system, or a chip comprising a physically isolated HSM.

10. The method according to claim 7, wherein the domain controller stores an ECU list, and the ECU is in the ECU list.

11. The method according to claim 7, wherein the firmware digest of the ECU is obtained by calculating firmware of the ECU according to a first digest function.

12. The method according to claim 7, the method further comprising:
receiving, by the server, the third signature information, the public key of the gateway, and the firmware digest of the ECU from the gateway;
performing, by the server, verification on the third signature information by using the public key of the gateway;
if the third signature information has been verified, sending, by the server, first response information to the gateway, wherein the first response information is used to indicate to start the ECU;
receiving, by the gateway, the first response information from the server;
sending, by the gateway, the first response information to the domain controller;
receiving, by the domain controller, the first response information from the gateway;
sending, by the domain controller, the first response information to the ECU; and
receiving, by the ECU, the first response information from the domain controller.

13. A non-transitory computer-readable medium having instructions stored thereon that, when executed by an in-vehicle security protection system, cause the in-vehicle security protection system to perform operations, the operations comprising:
generating, by an electronic control unit (ECU) of the in-vehicle security protection system, a public key of the ECU and a private key of the ECU by using a first security protection module deployed on the ECU, wherein the first security protection module is configured to provide security protection for the ECU, and a security level of the first security protection module is a first security level;
signing, by the ECU, a firmware digest of the ECU by using the private key of the ECU to obtain first signature information;
sending, by the ECU, the first signature information, the public key of the ECU, and the firmware digest of the ECU to a domain controller of the in-vehicle security protection system coupled to the ECU;
receiving, by the domain controller, the first signature information, the public key of the ECU, and the firmware digest of the ECU from the ECU;
generating, by the domain controller, a public key of the domain controller and a private key of the domain controller by using a second security protection module, wherein the second security protection module is configured to provide security protection for the domain controller, and a security level of the second security protection module is a second security level;
performing, by the domain controller, verification on the first signature information by using the public key of the ECU;
when the first signature information has been verified, signing, by the domain controller, the firmware digest of the ECU by using the private key of the domain controller, to obtain second signature information;

sending, by the domain controller, the second signature information, the public key of the domain controller, and the firmware digest of the ECU to a gateway of the in-vehicle security protection system coupled to the domain controller;

receiving, by the gateway, the second signature information, the public key of the domain controller, and the firmware digest of the ECU from the domain controller;

generating, by the gateway, a public key of the gateway and a private key of the gateway by using a third security protection module, wherein the third security protection module is configured to provide security protection for the gateway, and a security level of the third security protection module is a third security level;

performing, by the gateway, verification on the second signature information by using the public key of the domain controller;

when the second signature information has been verified, signing, by the gateway, the firmware digest of the ECU by using the private key of the gateway, to obtain third signature information; and sending, by the gateway, the third signature information, the public key of the gateway, and the firmware digest of the ECU to a server external to the in-vehicle security protection system.

14. The non-transitory computer-readable medium according to claim 13, wherein the third security level is higher than or equal to the second security level, and the second security level is higher than the first security level.

15. The non-transitory computer-readable medium according to claim 13, wherein the first security protection module comprises a device identifier composition engine (DICE), the second security protection module comprises a trusted platform module-thin, an embedded secure element (eSE), a chip comprising a physically isolated security processor (SP) system, or a chip comprising a physically isolated hardware security module (HSM), and the third security protection module comprises a trusted platform module-rich, an (eSE), a chip comprising a physically isolated SP system, or a chip comprising a physically isolated HSM.

16. The non-transitory computer-readable medium according to claim 13, wherein the domain controller stores an ECU list, and the ECU is in the ECU list.

17. The non-transitory computer-readable medium according to claim 13, wherein the firmware digest of the ECU is obtained by calculating firmware of the ECU according to a first digest function.

18. The non-transitory computer-readable medium according to claim 13, the operations further comprising:

receiving, by the server, the third signature information, the public key of the gateway, and the firmware digest of the ECU from the gateway;

performing, by the server, verification on the third signature information by using the public key of the gateway;

if the third signature information has been verified, sending, by the server, first response information to the gateway, wherein the first response information is used to indicate to start the ECU;

receiving, by the gateway, the first response information from the server;

sending, by the gateway, the first response information to the domain controller;

receiving, by the domain controller, the first response information from the gateway;

sending, by the domain controller, the first response information to the ECU; and receiving, by the ECU, the first response information from the domain controller.

* * * * *